United States Patent [19]

Karasawa et al.

[11] Patent Number: 4,786,900

[45] Date of Patent: Nov. 22, 1988

[54] ELECTRONIC KEY APPARATUS

[75] Inventors: Katsuaki Karasawa; Hideyuki Shoji; Tomoo Kasuo; Kazunori Kita; Syunichi Matsumoto; Keisuke Tonomura; Narutoshi Minami, all of Tokyo, Japan

[73] Assignee: Casio Computer Co. LTD., Tokyo, Japan

[21] Appl. No.: 910,649

[22] Filed: Sep. 23, 1986

[30] Foreign Application Priority Data

| | | | |
|---|---|---|---|
| Sep. 30, 1985 | [JP] | Japan | 60-217344 |
| Oct. 16, 1985 | [JP] | Japan | 60-232057 |
| Oct. 16, 1985 | [JP] | Japan | 60-232058 |
| Oct. 22, 1985 | [JP] | Japan | 60-235624 |
| Oct. 31, 1985 | [JP] | Japan | 60-246012 |

[51] Int. Cl.[4] .......... H04Q 1/00

[52] U.S. Cl. .......... 340/825.31; 340/825.19; 340/825.72

[58] Field of Search .......... 70/278, 256; 361/172; 235/382, 382.5; 307/10 AT; 340/825.3, 825.31, 825.32, 825.34, 825.69, 825.72

[56] References Cited

U.S. PATENT DOCUMENTS

| | | | |
|---|---|---|---|
| 3,891,980 | 6/1975 | Lewis et al. | 340/825.31 X |
| 4,189,712 | 2/1980 | Lemelson | 235/382 X |
| 4,353,064 | 10/1982 | Stamm | 235/382 X |
| 4,573,046 | 2/1986 | Pinnow . | |

*Primary Examiner*—Ulysses Weldon

*Attorney, Agent, or Firm*—Frishauf, Holtz, Goodman & Woodward

[57] ABSTRACT

An electronic key apparatus wherein an encrypted code for unlocking an electronic lock is stored in an encrypted code storage register. A password is stored in a password storage register. The same password as that stored in the password storage register, is input via a switch. The password input by the switch is compared with the password stored in the password storage register, by a coincidence detection circuit. When a coincidence is detected, the encrypted code stored in the encrypted code storage register is transmitted to the electronic lock, by a transmitter.

50 Claims, 29 Drawing Sheets

FIG. 8
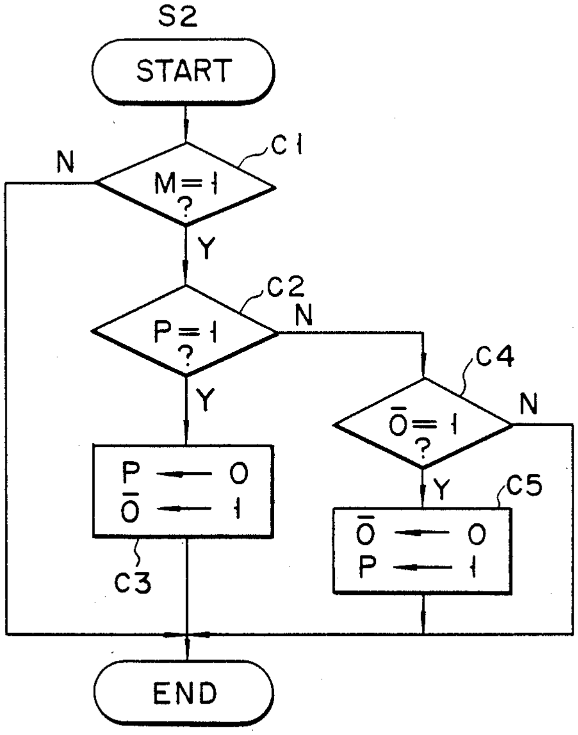
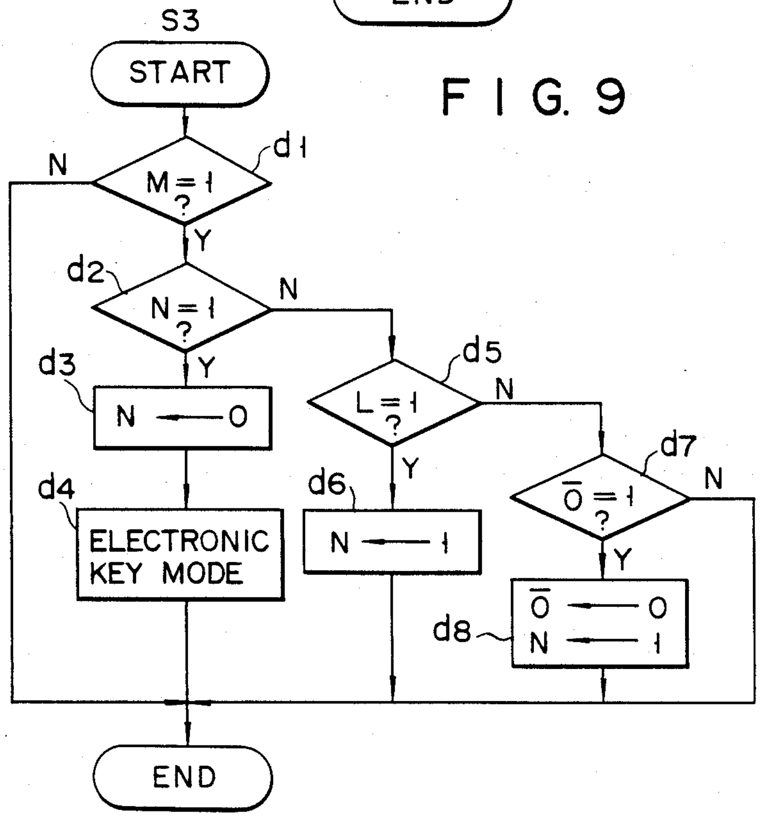
FIG. 9

ELECTRONIC KEY APPARATUS

BACKGROUND OF THE INVENTION

The present invention relates to an electronic key apparatus which comprises a memory for storing an encrypted or secret code for releasing a lock, and which supplies an encrypted code stored in the memory, by means of radio wave, light, ultrasonic wave, or the like, to release a lock.

A conventional security apparatus for a gate or door of a house or room, a door of a vehicle, a door or lid of a safe, desk, locker, drawer, or the like comprises a lock mechanism consisting of a mechanical lock and a key. The lock mechanism can be released only when a combination of mechanical factors, such as a three-dimensional shape in the lock, or the length or position or presence/absence of a pin or cylinder, coincides mechanically or dynamically with the three-dimensional shape, length, or position of the key or the presence/absence thereof.

In recent years, an electronically controlled lock apparatus has been developed in place of the mechanical lock mechanism using the mechanical lock and the key. In such a lock mechanism, for example, the lock has a plurality of numerical buttons, and electronic information "1" or "0" is input, by means of an electric signal (e.g., a high or low voltage level, or a large or small current, or an ON/OFF pulse) upon depression of buttons corresponding to a predetermined number, thereby locking/unlocking the lock mechanism, without using a mechanical key. In addition, an apparatus which can lock/unlock the lock mechanism from a distant location, by remote control, using a radio wave, or an apparatus utilizing a magnetic strip card on which an encrypted code is recorded on magnetic tape, is known.

U.S. Pat. No. 4,573,046 describes an electronic locking system which comprises a wristwatch which has a memory for storing a code for releasing a lock, and which radiates the code to the lock by way of an optical means, and also describes an apparatus for releasing the lock, in response to a predetermined code.

In the above system using mechanical comparison means, a key can be easily duplicated or counterfeited. Since the respective locks require different keys, the user must carry around a large number of keys. In addition, each lock must be manually locked/unlocked, thus posing problems in terms of operation, use, or security. When the lock is to be replaced, the keys must also be replaced. Accordingly, it is difficult to perform centralized control, resulting therefore, in poor compatibility or systematization.

In an electronically controlled apparatus comprising numerical buttons, the number to be input, in respect of each lock, must be memorized. If there are a plurality of locks, the user may easily forget their numbers. In the apparatus utilizing remote control, a remote control unit must be prepared for each lock, and the user must bring them with him. There is always the risk that the user may lose one or more the remote control units. In the apparatus using the magnetic strip card, the user must carry around a large number of cards corresponding to the respective locks, and he may easily lose these cards.

In the system disclosed in U.S. Pat. No. 4,573,046, a plurality of codes corresponding to a plurality of locks can be stored, and the code corresponding to a desired lock can be selectively output upon switch operation, thus resulting in increased convenience.

However, in the system of this patent, if a wristwatch storing the codes of the locks is stolen, all the locks may be unlocked by the signal emitted from the stolen wristwatch. Even if the watch was not stolen, there is always the possibility that, a third party may operate the switches without permission, to erase or update the codes, with the result that the locks cannot then be unlocked by the original user.

SUMMARY OF THE INVENTION

The present invention has been made in consideration of the above situation, and has as its object to provide an electronic key apparatus which can be commonly used for a large number of locks, and which has excellent security and crime-prevention functions.

In order to achieve the above object, there is provided encrypted-code storage means for storing an encrypted code for unlocking an electronic lock;

pass data storage means for storing password data;

data-input switch means for inputting the same pass data as that stored in said password data storage means;

data-coincidence detection means for detecting a coincidence between the data input by said data-input switch means and the pass data stored in said pass data storage means; and encrypted-code transmitting means for transmitting the encrypted code stored in said encrypted-code storage means to said electronic lock, when a coincidence is detected by said data-coincidence detection means.

With this arrangement of the present invention, an electronic key apparatus can set, update, and output an encrypted code only when the input pass data coincides with prestored data. Therefore, a lock can be protected from being unlocked by a third party, or an encrypted code can be prevented from being updated without permission, thus providing the electronic key apparatus with high security.

BRIEF DESCRIPTION OF THE DRAWINGS

FIG. 8 is a flow chart showing the processing when switch S2 is depressed;

FIG. 9 is a flow chart showing the processing when switch S3 is depressed;

DETAILED DESCRIPTION OF THE PREFERRED EMBODIMENT

The preferred embodiment of the present invention will now be described with reference to the accompanying drawings.

Figure 1:
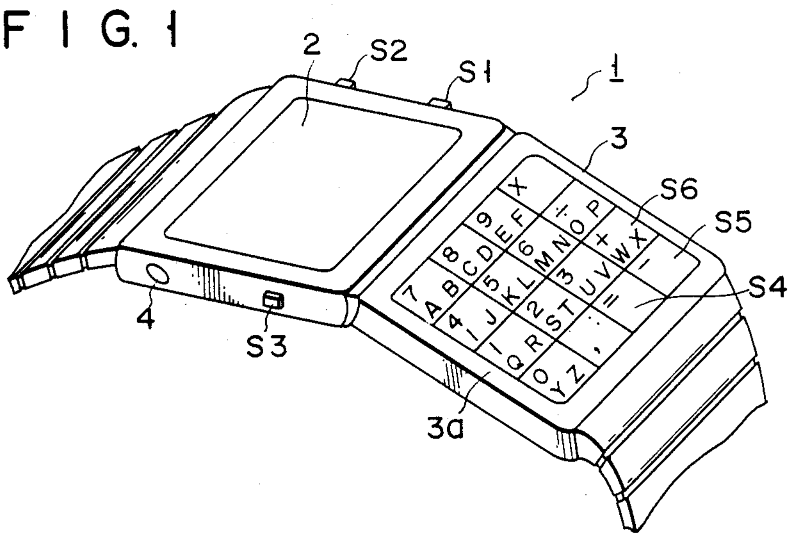
FIG. 1 is a perspective view of an electronic wristwatch according to an embodiment of the present invention.

FIG. 1 is a perspective view showing an embodiment in which the present invention is applied to an electronic wristwatch. Referring to FIG. 1, wristwatch casing 1 has a display section 2 comprising, for example, a liquid crystal display device, and key-operation section 3 comprising various keys 3*a*. Switches S1, S2, and S3, and LED 4 are arranged on the side end face of display section 2. Switches S1, S2, and S3, equal (=) switch S4, minus (−) switch S5, and plus (+) switch S6 have a function for switching the display modes of display section 2, as will be described later in detail.

Figure 2:
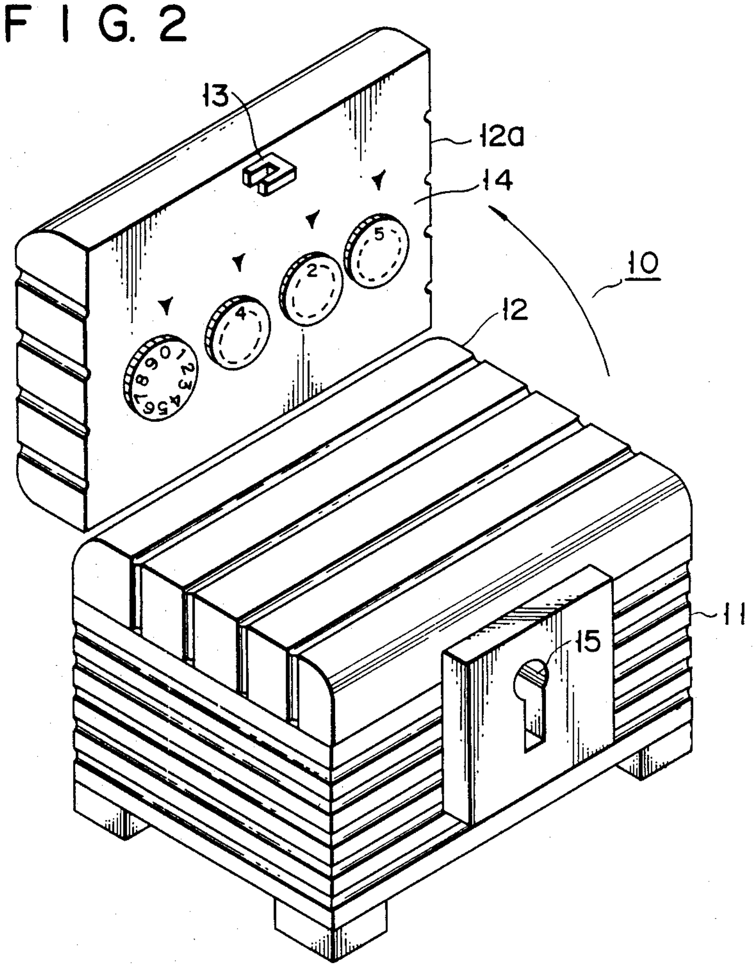
FIG. 2 is a perspective view of a jewel box, the lock mechanism of which is released by the wristwatch shown in FIG. 1.

FIG. 2 is a perspective view of jewel box 10, the lock mechanism of which is released by a signal emitted from the wristwatch shown in FIG. 1. Jewel box 10 comprises a casing 11 and lid 12. Lid 12 is mounted on casing 11, to be openable/closable by means of a hinge (not shown), as indicated by numeral 12*a* in FIG. 2. Projection 13 engaged with an engaging portion arranged inside casing 11 is formed on the inner surface of lid 12. Projection 13 and the engaging member constitute a lock mechanism. When lid 12 is closed, projection 13 and the engaging member are engaged with each other, to automatically lock the lock mechanism.

Four digital dial switches 14 are arranged on the inner surface of lid 12. Switches 14 are rotated to obtain a desired combination of numerals, and are electrically connected to the lock mechanism. The lock mechanism is released when a light signal corresponding to a number (e.g., "0425," in FIG. 2) set by switches 14 is output from LED 4 of the wristwatch shown in FIG. 1, and is received through key hole 15, or the lock mechanism is released by a predetermined key.

Figure 3:
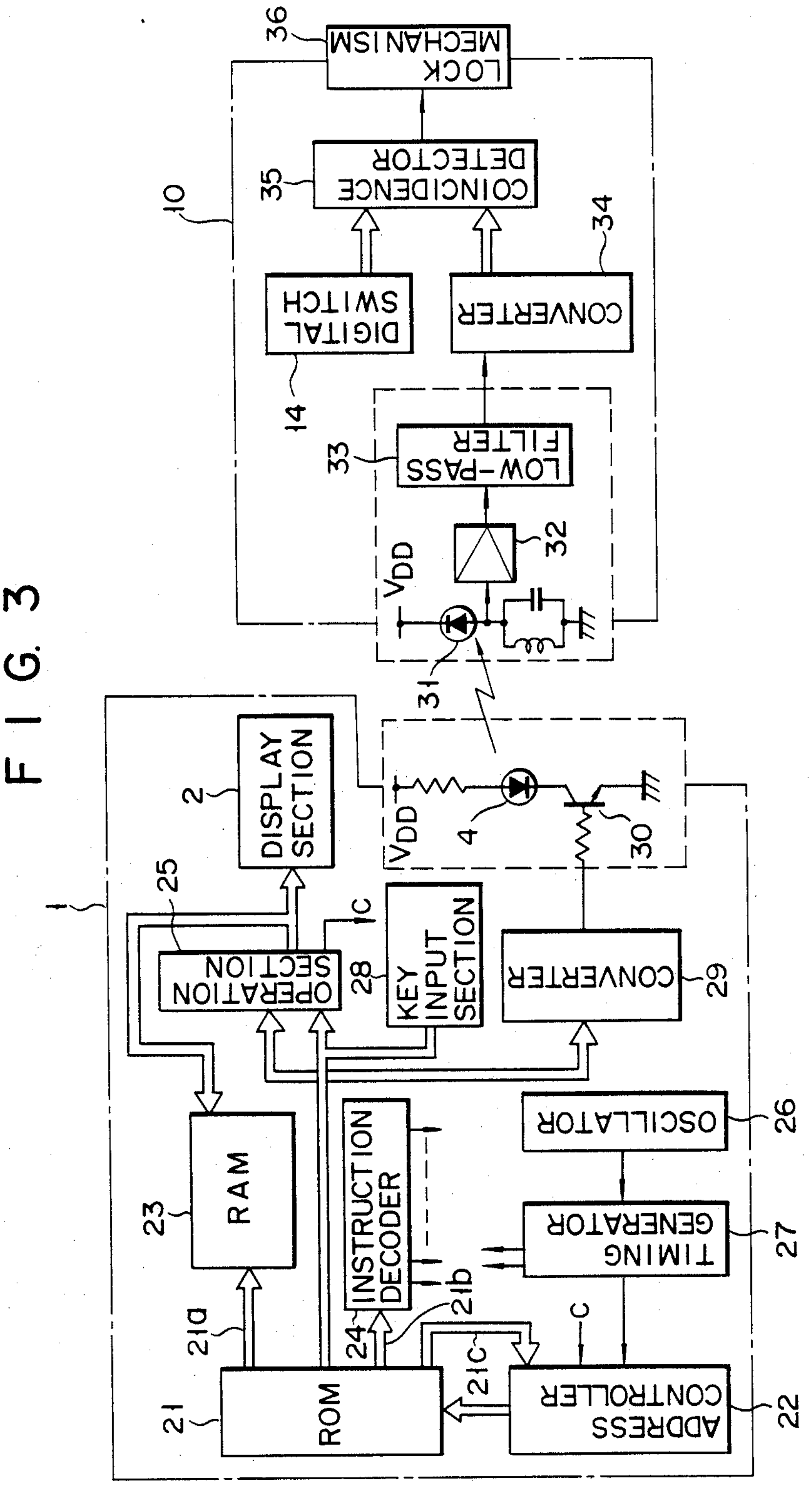
FIG. 3 is a circuit diagram showing the circuit arrangement of the wristwatch, and the jewel box shown in FIGS. 1 and 2.

FIG. 3 shows the circuit configuration of wristwatch casing 1 and jewel box 10 shown in FIGS. 1 and 2, respectively.

Wristwatch casing 1 will be described first. ROM 21 is a fixed memory, which prestores a program or data for controlling the entire system. Address controller 22 is an address section of ROM 21 for defining the program flow, and receives the output signals of ROM 21, operation section 25 (or ALU), and frequency-divider 27. RAM 23 is a memory which outputs data stored at an address specified by address signal 21*a* from ROM 21 to operation section 25 or converter 29, and receives the result processed by section 25, to store it therein. Instruction decoder 24 decodes instruction output signal 21*b* of ROM 21, and sends a control signal to respective blocks. Operation section 25 performs an arithmetic operation using data in RAM 23, based on an instruction from ROM 21 and key-input section 28. Section 25 writes the result at an address in RAM 23 specified by ROM 21, and displays it in display section 2. Display section 2 is the same as that shown in FIG. 1. Signal 21*c* output from ROM 21 is a next address signal for specifying the next address. Oscillator 26 generates a clock signal having a given period. Timing generator 27 frequency-divides the clock signal to a predetermined frequency, and generates a timing signal for time-serially controlling the respective function blocks. Key-input section 28 is a block for instructing various processing operations, to the corresponding function blocks, in response to key operations, and includes switches S1, S2, and S3, and key-operation section 3, shown in FIG. 1.

Converter 29 converts an encrypted code (to be described later), written in RAM 23, into H (High)-level and L (Low)-level electrical signals. Transistor 30 is turned on or off in accordance with the output signal of converter 29, and LED 4 is turned on or off in response to this, thereby generating a light signal indicating the encrypted code. LED 4 is the same as that shown in FIG. 1.

The circuit configuration of jewel box 10 will be described hereinafter. Photodiode 31 is turned on or off upon reception of the light signal from LED 4, to convert the light signal into an electrical signal. Note that photodiode 31 is arranged in key hole 15, to be able to detect light propagating from an external circuit through hole 15. A phototransistor can be used in place of photodiode 31. Amplifier 32 amplifies the electrical signal obtained by photodiode 31, and low-pass filter 33 derives a low-frequency component from the output signal of amplifier 32. Converter 34 converts the output signal of low-pass filter 33 into a digital signal (encrypted code). Coincidence detector 35 compares the number set by switches 14 and the digital signal (encrypted code) output from converter 34. When a coincidence is found therebetween, detector 35 generates a coincidence signal. Lock mechanism 36 is constituted by projection 13 and the engagement member of casing 11, shown in FIG. 2. Upon reception of the coincidence signal, engagement between projection 13 and the engagement member is released, thereby releasing a lock.

Figure 4:
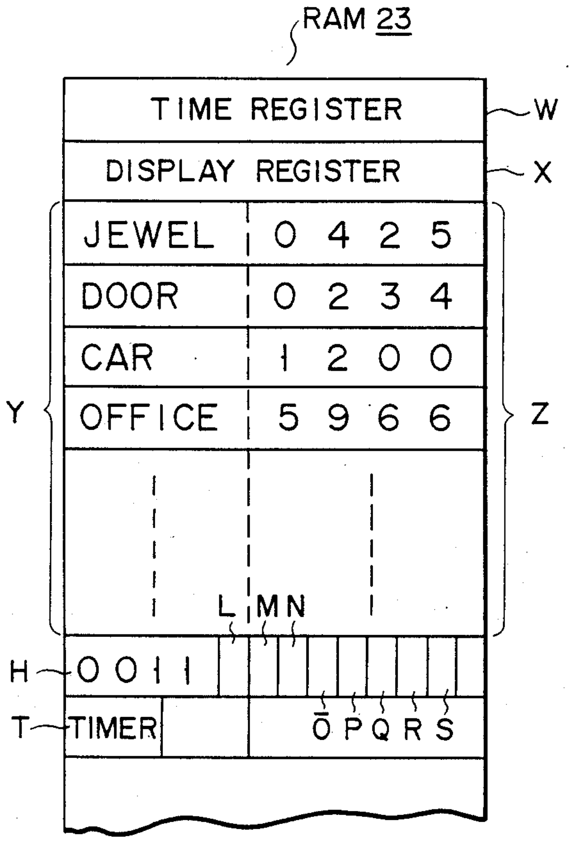
FIG. 4 is an internal memory map of a RAM shown in FIG. 3.

FIG. 4 shows the internal memory map of RAM 23 described above. Referring to FIG. 4, RAM 23 comprises time register W, display register X, item storage register Y, encrypted-code storage register Z, password data (i.e., pass data) storage register H, password data-set flag L, electronic key-operation mode flag M, password data-input mode flag N, mode-selection flag O, password data-update mode flag P, item/code-update/-set flag Q, item-input mode flag R, code-output mode flag S, timer T, and the like.

Time register W is a register for storing time data, for example, hours, minutes, seconds, 1/16 seconds, and the like, and display register X is a register for temporarily storing data displayed in display section 2. Item storage register Y and encrypted-code storage register Z comprise a plurality of registers, and the respective registers store items corresponding to various locks and the encrypted code set for each item. For example, in FIG. 4, an item for jewel box 10 is set to be "JEWEL", and the encrypted code corresponding thereto is set to be "0425". Items for doors of a house, a vehicle, and an office are set to be "DOOR", "CAR", and "OFFICE", respectively, and the encrypted codes are set in correspondence therewith. Password data storage register H stores password data, i.e., data comprising a secret number or symbol which is known to a specific person. In FIG. 4, register H stores password data "0011".

Password data-set flag L is set to be "1" when password data is set in register H. Electronic key-operation mode flag M is set to be "1" when a display mode associated with the operation of an electronic key other than a time display mode (electronic key-operation mode; to be described later) is selected. Password data-input mode flag N, mode-selection flag $\overline{O}$, password data-update mode flag P, item/code-update/set flag Q, item-input mode flag R, and code-output mode flag S are set to be "1" respectively, when password data-input mode, a mode-selection mode, a password data-update mode, an item/code-update/set mode, an item-input mode, and a code-output mode. Timer T measures time in units of seconds, and the measurement result serves as a timing signal for automatically switching the predetermined display modes.

The flow chart of the operation of the embodiment having the above circuit configuration will be explained below.

Figure 5:
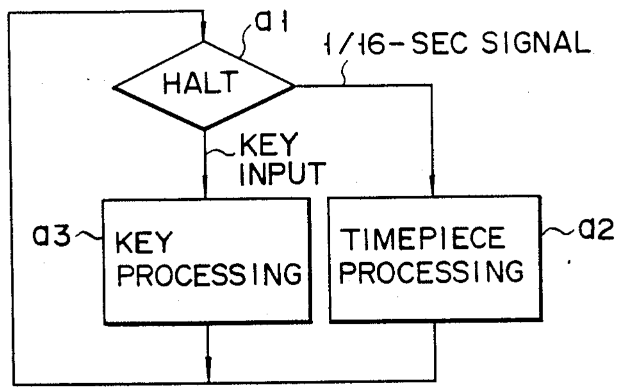
FIG. 5 is a general flow chart showing the functions of the wristwatch shown in FIG. 1.

FIG. 5 is a general flow chart. If there is no key-processing instruction in the HALT state (a1), timepiece processing is executed every 1/16 sec (a2). The timepiece processing is executed in response to a timepiece clock signal output from timing generator 27, shown in FIG. 3 (to be described later in detail), every 1/16 sec. Time data obtained by this processing is stored in time register W, in RAM 23, shown in FIG. 4.

If switches S1 through S6 and the like, shown in FIG. 1, are depressed in the HALT state (a1), key processing is executed (a3). The key processing is executed by ROM 21, RAM 23, and the like, based on the signal output from key-input section 28, shown in FIG. 3, upon operation of the keys.

Processing upon operation of switches S1 through S6, and a change of display mode, will be described hereinafter.

Figure 6:
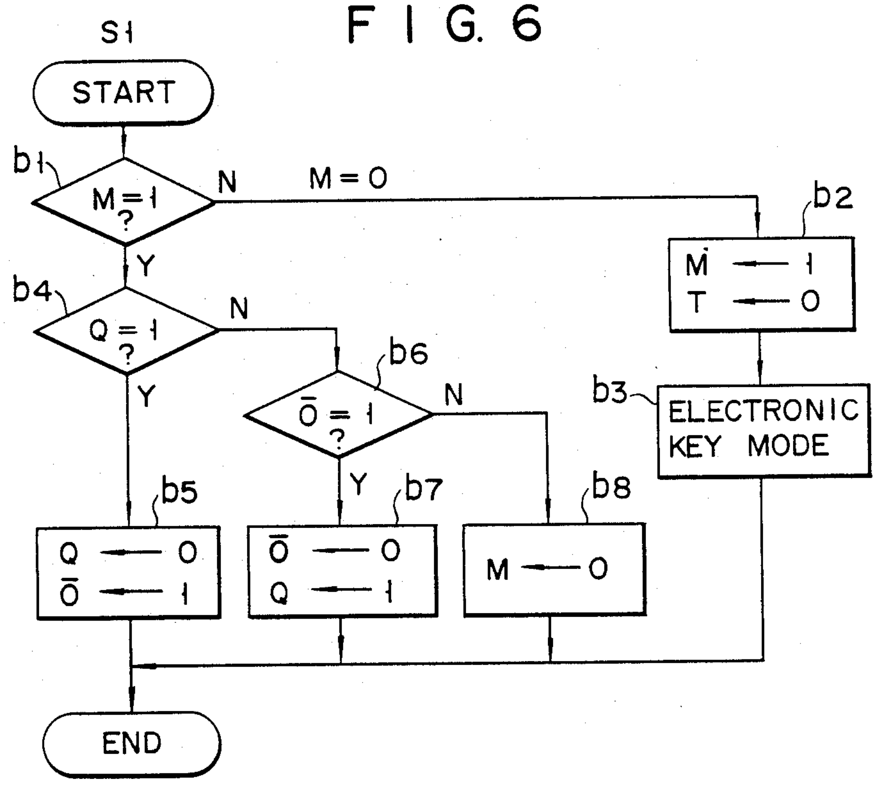
FIG. 6 is a flow chart showing the processing when switch S1 is depressed in key-processing a3 shown in FIG. 5.
Figure 7:
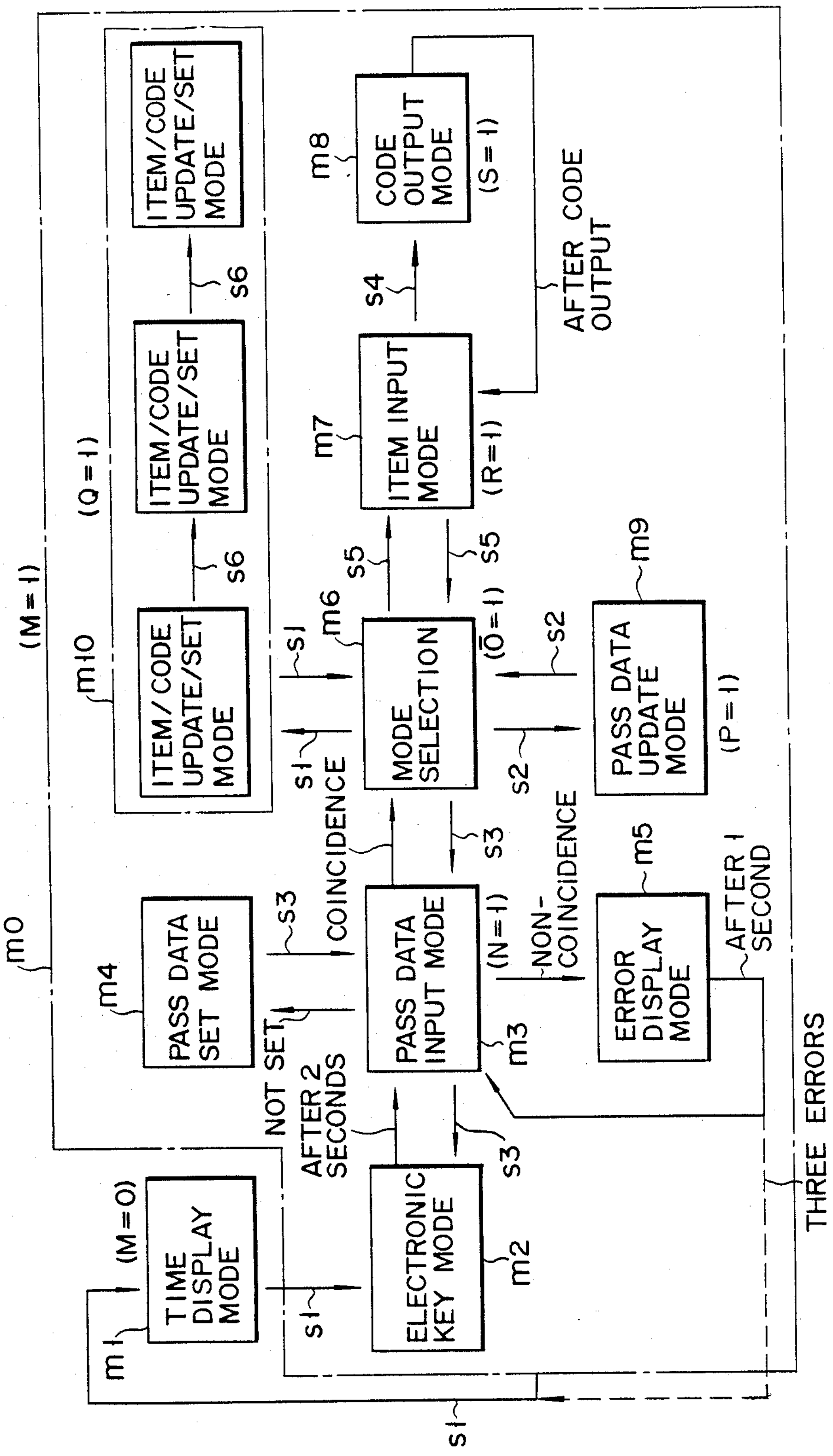
FIG. 7 is a diagram showing a change of display mode upon depression of keys.

FIG. 6 is a flow chart showing the processing when switch S1 is depressed, and FIG. 7 shows a change of display state, upon depression of the keys. When switch S1 is depressed, it is checked, in step b1, if electronic key-operation mode flag M is "1", as shown in FIG. 6. When flag M is "0", a time-display mode is set, and when flag M is "1", the display mode for the electronic keys is set, as shown in FIG. 7. If M=1, i.e., if a time-display mode (i.e., mode m1 in FIG. 7) is selected, flag M is set to be "1" and timer T is reset, in step b2. In step b3, the display mode is electronic key mode (mode m2 in FIG. 7).

If M=1 in step b1, i.e., if the electronic key-operation mode (mode m0 in FIG. 7) is selected, it is checked, in step b4, if item/code-update/set flag Q is "1". If Q=1, i.e., if an item/code-update/set mode (mode m10 in FIG. 7) is selected, flag Q is set to be "0" and mode-selection flag $\overline{O}$ is set to be "1", in step b5, thereby switching the display mode to a mode-selection mode (mode m6 in FIG. 7). However, if Q≠1, in step b4, it is checked, in step b6, if $\overline{O}$=1. If $\overline{O}$=1, i.e., mode-selection mode m6 is set, flag $\overline{O}$ is set to be "0" and flag Q is set to be "1", in step b7, thereby switching the display mode to item/code-update/set mode m10. However, if $\overline{O}$≠1, in step b6, flag M is set to be "0", in step b8, thereby switching the display mode to time-display mode m1.

FIG. 8 shows processing upon operation of switch S2. When switch S2 is depressed, it is checked, in step c1, if flag M is "1". If M≠1, no processing is executed. If M=1, it is checked, in step c2, if password data-update mode flag P is "1". If P=1, i.e., a password data-update mode (mode m9 in FIG. 7) is selected, flag P is set to be "0" and flag $\overline{O}$ is set to be "1", in step c3, thereby switching the display mode to mode selection mode m6. However, if P≠1, in step c2, it is checked, in step c4, if $\overline{O}$=1. If $\overline{O}$=1, flag $\overline{O}$ is set to be "0" and flag P is set to be "1" in step c5, thereby switching the display mode to password data-update mode m9.

FIG. 9 shows processing upon operation of switch S3. When switch S3 is operated, it is checked, in step d1, if flag M is "1". If M≠1, no processing is executed. If M=1, it is checked, in step d2, if password data-input mode flag N is set to be "1". If N =1, i.e., a pass data input mode (mode m3 in FIG. 7) is selected, flag N is set to be "0", in step d3, and the display mode is switched to electronic key mode m2, in step d4.

If N≠1 in, step d2, it is checked, in step d5, if password data-set flag L is "1", i.e., if password data is set in register H. If L=1, flag N is set to be "1", in step d6, thereby switching the display mode to password data input mode m3. However, if L≠1, in step d5, it is checked, in step d7, if mode-selection flag $\overline{O}$ is "1". If $\overline{O}$=1, flag $\overline{O}$ is set to be "0" and flag N is set to be "1", in step d8, thereby switching the display mode to password data-input mode m3.

Figure 10:
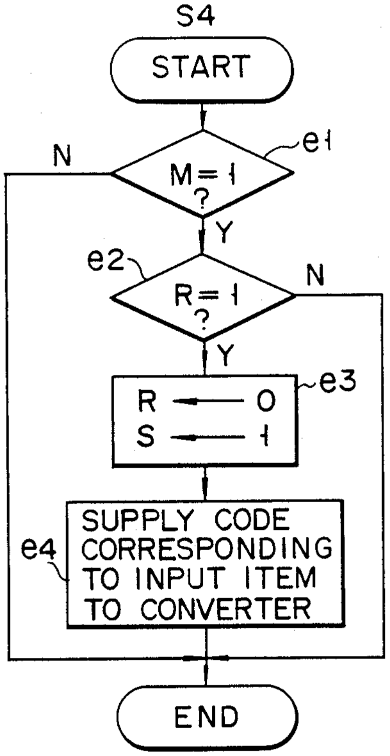
FIG. 10 is a flow chart showing the processing when switch S4 is depressed.

FIG. 10 shows processing upon operation of switch S4. When switch S4 is operated, it is checked, in step e1 if M=1. If M≠1, no processing is executed, and if M=1, it is checked, in step e2, if item-input mode flag R is "1". If R≠1, no processing is executed. However, if R=1, i.e., if item-input mode (mode m7 in FIG. 7) is selected, flag R is set to be "0" and code-output mode flag S is set to be "1", in step e3, thereby switching the display mode to a code-output mode (m8 in FIG. 7). An encrypted code corresponding to an input item is derived from register Z, in FIG. 4, in step e4, and is sent to converter 29, shown in FIG. 3.

Figure 11:
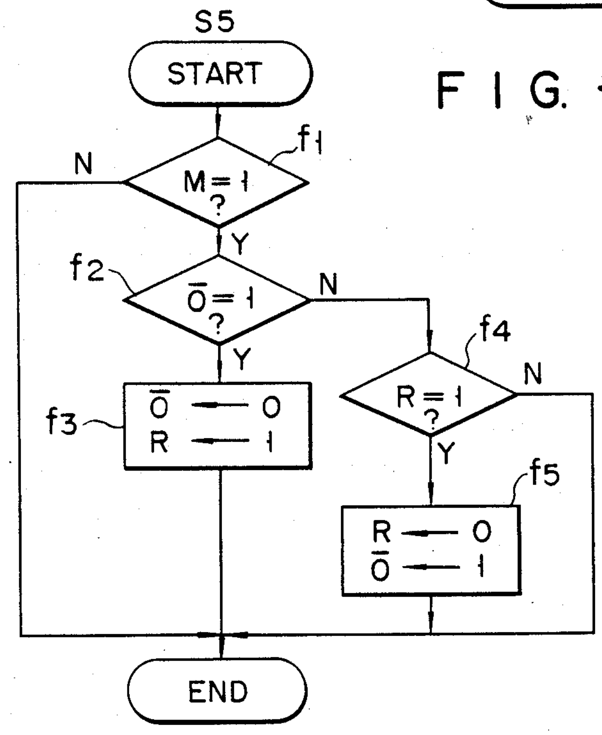
FIG. 11 is a flow chart showing the processing when switch S5 is depressed.

FIG. 11 shows processing upon operation of switch S5. When switch S5 is operated, it is checked, in step f1, if M=1. If M=1, it is checked, in step f2, if flag $\overline{O}$ is "0". If O=1, i.e., mode selection mode m6 is selected, flag $\overline{O}$ is set to be "0" and item input mode flag R is set to be "1", in step f3, thereby switching the display mode to item-input mode m7.

However, if $\overline{O}\neq 1$, in step f2, it is checked, in step f4, if R=1. If R≠1, no processing is performed. If R=1, flag R is set to be "0" and flag O is set to be "1", in step f5, thereby switching the display mode to mode-selection mode m6.

Figure 12:
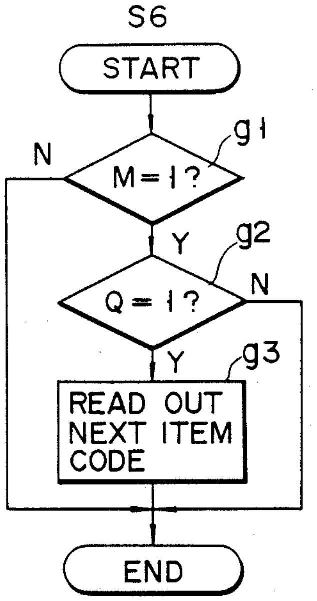
FIG. 12 is a flow chart showing the processing when switch S6 is depressed.

FIG. 12 shows processing when switch S6 is operated. Upon operation of switch S6, it is checked, in step g1, if M=1. If M=1, it is checked, in step g2, if item/code-update/set flag Q is 1. If Q≠1, no processing is performed. If Q=1, the next item and the encrypted code are read out, in step g3.

Figure 13:
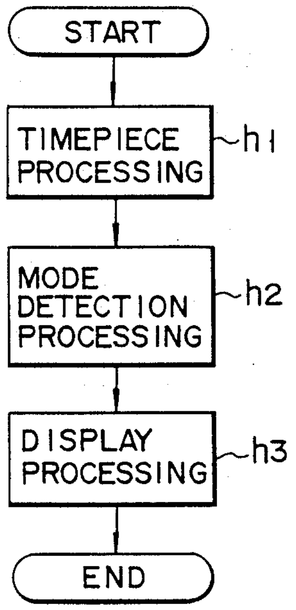
FIG. 13 is a detailed flow chart of timepiece processing in step a2 in FIG. 5.

Timepiece processing a2 executed every 1/16 sec, shown in FIG. 5, comprising timepiece-processing step h1, mode-detection processing step h2, and display-processing step h3, as shown in FIG. 13.

Figure 14:
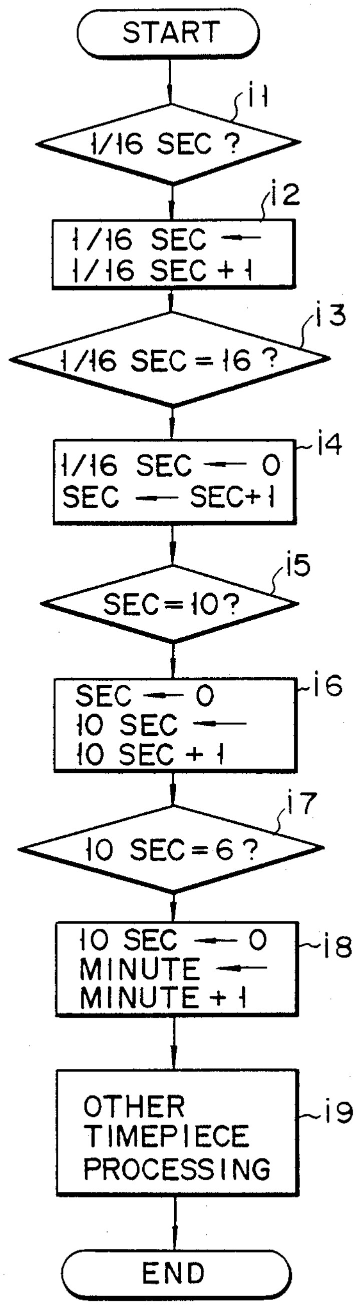
FIG. 14 is a detailed flow chart of timepiece processing h1 in FIG. 13.

FIG. 14 shows step h1 in detail. In step i1, the presence/absence of a 1/16-sec timepiece clock signal is checked. If the signal is detected, a 1/16-sec counter (not shown) in time register W in RAM 23, shown in FIG. 4, is incremented by 1, in step i2. It is checked, in step i3, if the 1/16-sec counter has counted 16, i.e., if one second has passed. If one second has passed, the 1/16-sec counter is reset and a second counter (not shown) in register W is incremented by 1, in step i4. It is checked, in step i5, if the second counter has counted 10, i.e., if 10 seconds have passed. If 10 seconds have passed, the second counter is reset and a 10-sec counter (not shown) in register W is incremented by 1, in step i6. It is checked, in step i7, if the 10-sec counter has counted 6, i.e., one minute has passed. If one minute has passed, the 10-sec counter is reset and a minute counter (not shown) in register W is incremented by one, in step i8. In this manner, other timepiece processing in unit times is similarly executed, in step i9.

Figure 15A:
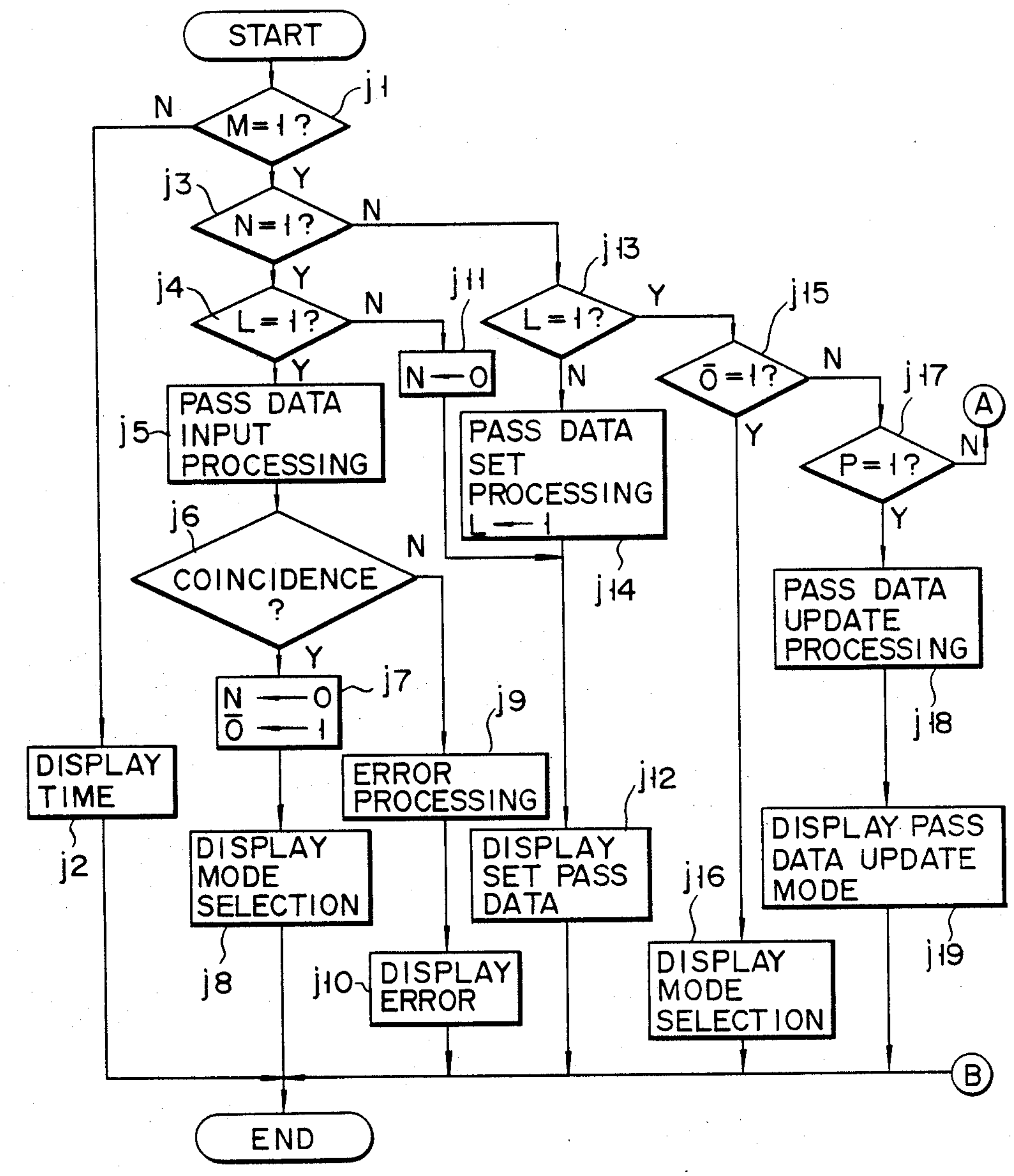
FIGS. 15A and 15B are detailed flow charts of mode-detection processing h2 and display processing h3 shown in FIG. 13.
Figure 15B:
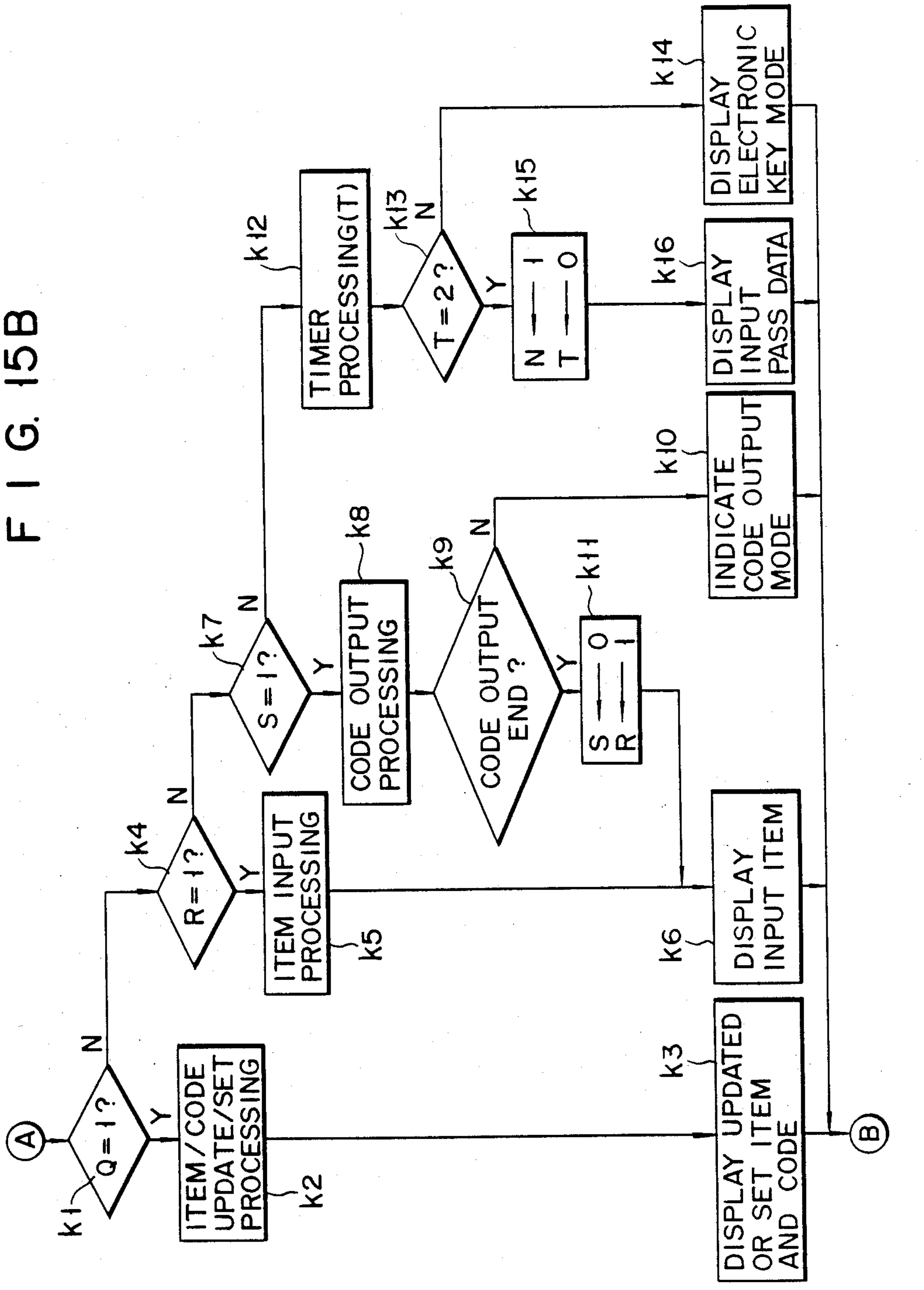

FIGS. 15A and 15B show steps h2 and h3 shown in detail, in FIG. 13.

Figure 16A:
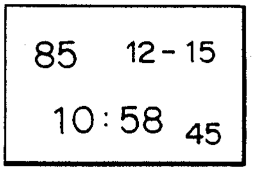
FIGS. 16A through 16F are representations showing display states of a display section in the respective modes.

Referring to FIG. 15A, it is checked, in step j1, if flag M is "1". If M≠1, time data is displayed, in step j2. This time display is performed such that time data written in register W by timepiece processing, shown in FIG. 14, is temporarily written in register X and is then displayed in display section 2. FIG. 16A shows this display state.

Figure 16B:
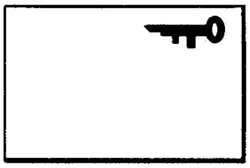
Figure 16C:
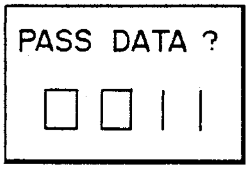
Figure 16D:
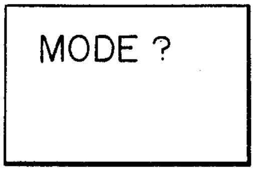

If M=1, in step j1, it is checked, in step j3, if flag N is "1". If N=1, it is checked, in step j4, if flag L is "1", i.e., if password data has already been set. If L=1, password data-input processing is executed, in step j5, and it is checked, in step j6, if the preset password data coincides with input password data. If a coincidence is found therebetween, flag N is set to be "0" and flag O is set to be "1", in step j7, thereby switching the display mode to mode-selection mode m6. Thus, mode-selection display is performed, in step j8. FIG. 16D shows this display state.

If a noncoincidence is found in step j6, error processing is executed, in step j9, and the display mode is switched to error-display mode m5, in step j10, thus performing error display. If L≠1, in step j4, flag N is set to be "0", in step j11, and the display mode is switched to password data-set mode m4, in step j12, thus performing password data-set display.

If N≠1, in step j3, it is checked, in step j13, if L=1. If L≠1, since password data-set mode m4 is set, password data-set processing is executed and flag L is set to be "1", in step j14. In step j12, the password data set in step j14 is displayed.

If L=1, in step j13, it is checked, in step j15, if flag $\overline{O}$ is "1". If $\overline{O}=1$, mode-selection display is performed, in step j16. This display is performed in the same manner as in step j8, as shown in FIG. 16D.

If $\overline{O}\neq 1$, in step j15, it is checked, in step j17, if flag P is "1". If P=1, password data is updated, in step j18, and this updated password data is displayed, in step j19.

If P≠1, in step j17, it is checked, in step k1, in FIG. 15B, if flag Q is "1". If Q=1, update/set processing for an item and an encrypted code is performed, in step k2, and the updated or set item and encrypted code are displayed, in step k3.

Figure 16E:
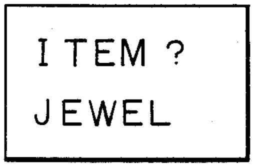

If Q≠1, in step k1, it is checked, in step k4, if flag R is "1". If R=1, item input processing is performed, in step k5. This processing is performed by writing input item data in register X. In step k6, the item written in register X is displayed. The display state is shown in FIG. 16E. Referring to FIG. 16E, item "JEWEL", indicating a jewel box, is displayed.

Figure 16F:
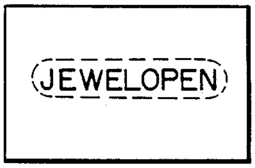

If R≠1, in step k4, it is checked, in step k7, if code-output mode flag S is 1. If S=1, an encrypted code corresponding to an input item is sent to converter 29, shown in FIG. 3, in step k5, and processing for driving LED 4 is performed, in step k8. It is checked, in step k9, if output of an encrypted code is completed. If the encrypted code is being output, the code-output mode is displayed by flickering, as shown in FIG. 16F, in step k10. The encrypted code is output as a light signal from LED 4, shown in FIG. 3, and is received by photodiode 31 of jewel box 10. If the number set by switches 14 coincides with the encrypted code, the lock is released. If code output completion is detected in step k9, flag S is set to be "0" and flag R is set to be "1", in step kll. Then, an input item is displayed, in step k6.

If S≠1, in step k7, i.e., if the display mode has just been switched from time-display mode m1 to electronic key mode m2, timer processing is performed by timer T, shown in FIG. 4 in step k12, and it is checked, in step k13, if two seconds have passed. If two seconds have not yet passed, electronic key mode display, shown in FIG. 16B is performed, in step k14. If two seconds have passed, timer T is reset and flag N is set to be "1", in step k15. Then, input password data is displayed, in step k16. FIG. 16C illustrates this display state. In FIG. 16C, password data "0011" is input.

A change in display mode, upon operation of switches S1 through S6 described above, will be explained again, with reference to FIGS. 7 and 16A through 16F.

In the state of time-display mode m1, time data is displayed as shown in FIG. 16A. When the electronic key is to be operated, switch S1 is depressed in this state. Thus, the display mode is switched to electronic key mode m2, and the electronic key is displayed, as shown in FIG. 16B.

Two seconds after mode m2 is selected, the display mode is switched to password data-input mode m3. If password data, for example, "0011", is input in this state, input password data is displayed as shown in FIG. 16C. Only when the input password data coincides with preset password data, is the display mode switched to mode-selection mode m6, and the electronic key can then be used. If a noncoincidence is found, the display mode is switched to error-display mode m5, and error display (not shown) is performed. Thereafter, when one second has passed, the display mode is again switched to password data-input mode m3. If errors are detected on three successive occasions, the display mode returns to time-display mode m1. In this manner, a person who does not know the preset password data cannot use the electronic key, i.e., cannot output an encrypted code, update or set an item and an encrypted code, nor update password data. Note that if password data is not set, the display mode is switched to password data-set mode m4. Therefore, if switch S3 is depressed after password data is desirably set, the display mode is switched to mode m3.

If a coincidence is found between input and preset password data and the display mode is switched to mode-selection mode m6, the display shown in FIG. 16D is performed. If the electronic lock is to be released, in this case, switch S5 is depressed. Then, the display mode is switched to item-input mode m7. In this state, when an item corresponding to a desired electronic lock, for example, "JEWEL" for a jewel box, is input, the input item is displayed as shown in FIG. 16E. When an encrypted code corresponding to the displayed item is to be output, the light-output direction of LED 4, shown in FIG. 1, is directed toward key hole 15, in FIG. 2, and only switch S4 need be depressed. While the encrypted code is output, the display mode is switched to code-output mode m8, and the flickering display shown in FIG. 16F is performed. After output of the encrypted code is completed, the display mode is again switched to item-input mode m7. In this manner, when the encrypted code is to be output to the electronic lock, it need not be input, and only an item corresponding to a desired electronic lock need be input.

When an item and an encrypted code are to be updated or set, switch S1 is depressed, in mode-selection mode m6. Thus, the display mode is switched to item/code-update/set mode m10, and the item and the encrypted code can be updated or set in this state. Each time switch S6 is depressed, the item and the encrypted code are sequentially switched. When switch S1 is depressed again, the display mode returns to mode-selection mode m6.

When password data is to be updated, switch S2 is operated, in mode-selection mode m6. Then, the display mode is switched to password data-update mode m9, and password data can be updated in this state. If the display mode is to be returned to mode-selection mode m6, only switch S2 need be depressed.

If the display mode is switched from electronic key-operation mode m0, i.e., modes m2 through m10 associated with the operation of the electronic key, to time display mode m1, switch S1 is depressed.

The present invention is not limited to the wristwatch described above, but can be applied to a pocket-type compact calculator or to other equipment worn or carried by the user. In the above embodiment, the jewel box has been exemplified as the electronic lock apparatus. However, the present invention is not limited to this. For example, the present invention can be applied to an electronic lock incorporated in the doors of a house, an office, a vehicle, and the like.

RAM 23 can be a nonvolatile memory, more specifically, an EEPROM. With this arrangement, even if a dry cell of a wristwatch or the like is used up, the encrypted codes will not be erased.

The medium for transmitting an encrypted code is not limited to light from an LED, but can be a radio wave, a sound wave, and the like.

An item (i.e., item data) can be the full name of an object, or it can be an initial character thereof or two to three characters from the initial character. In addition, items can be sequentially designated by a single switch.

Password data is not limited to the number described above, but can be the number of operation times of a predetermined switch or an operation time interval, or a combination of various operation switches, or specific voice data or speech data, when a voice recognition function is provided.

FIGS. 17 through 24I show another embodiment of the present invention.

Figure 17:
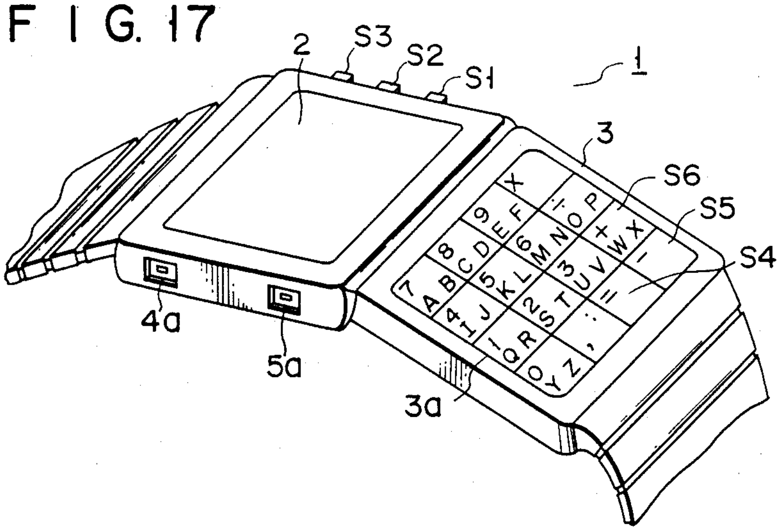
FIG. 17 is a perspective view of an electronic wristwatch according to another embodiment of the present invention.

FIG. 17 shows an electronic wristwatch, in which switches S1 through S3 are arranged at one side of display section 2, LED 4a and photodiode 5a are arranged at the other side of section 2, and other arrangements are the same as those shown in FIG. 1.

Figure 18:
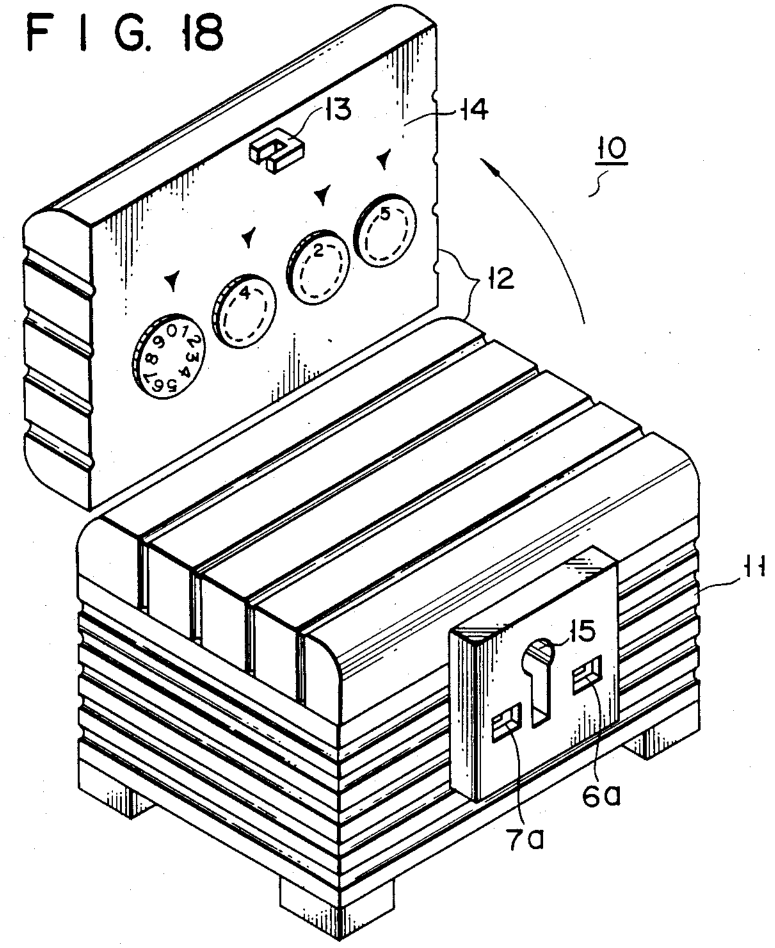
FIG. 18 is a perspective view of a jewel box according to this other embodiment of the present invention.

FIG. 18 shows substantially the same jewel box as that shown in FIG. 2. The difference between the jewel boxes shown in FIGS. 2 and 18 is that photodiode 6a and LED 7a are arranged at a distance equal to that between LED 4a and photodiode 5a of the wristwatch shown in FIG. 17.

Figure 19:
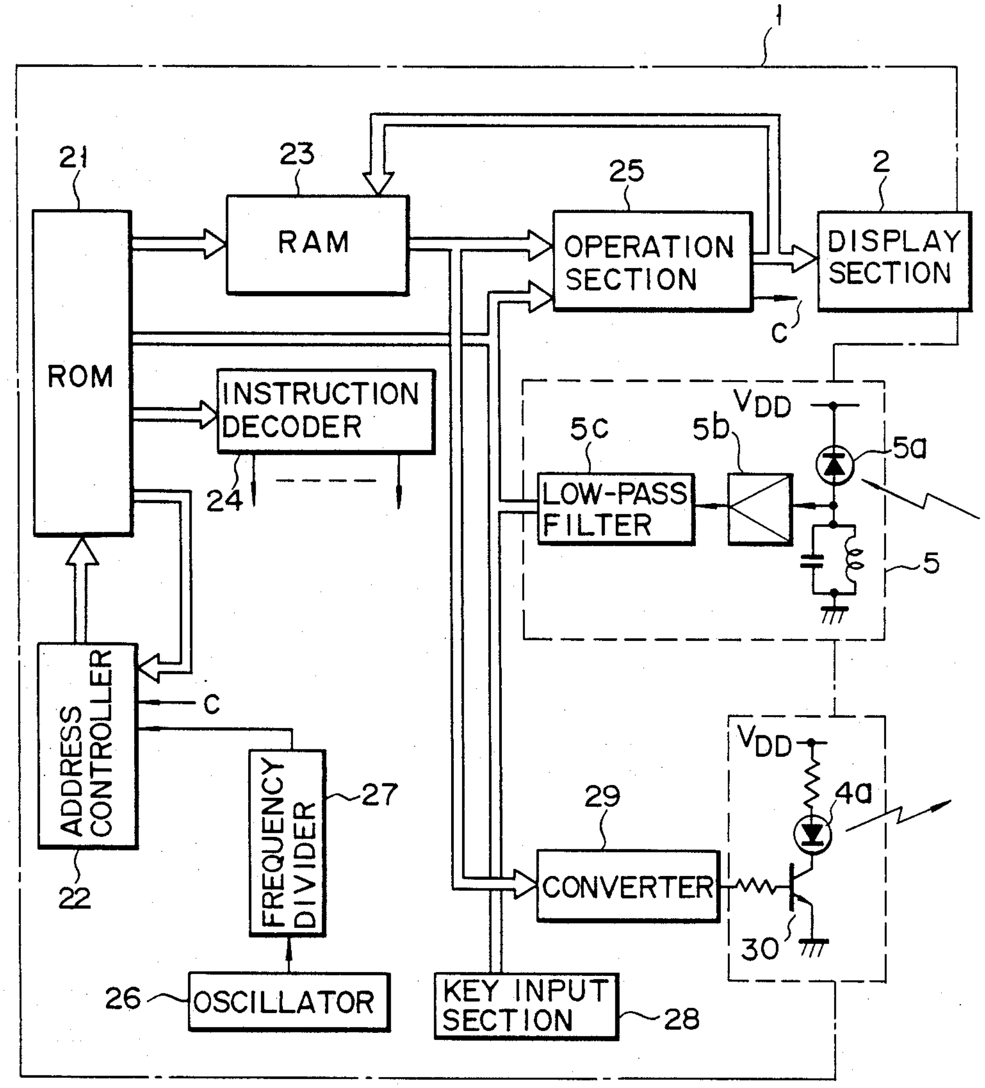
FIG. 19 is a circuit diagram of the wristwatch shown in FIG. 17.

FIG. 19 shows the circuit configuration of wristwatch casing 1 shown in FIG. 17. The same reference numerals in FIG. 19 denote the same parts as in FIG. 3, and a detailed description thereof will be omitted.

The difference between the circuits shown in FIGS. 3 and 19 is that receiver 5 is added to the circuit shown in FIG. 19. Receiver 5 comprises photodiode 5a, shown in FIG. 17, amplifier 5b, low-pass filter 5c, and the like, and receives a response signal (to be described later) emitted from LED 7a of jewel box 10, to convert it into an electrical signal, thereby outputting the converted electrical signal.

Figure 20:
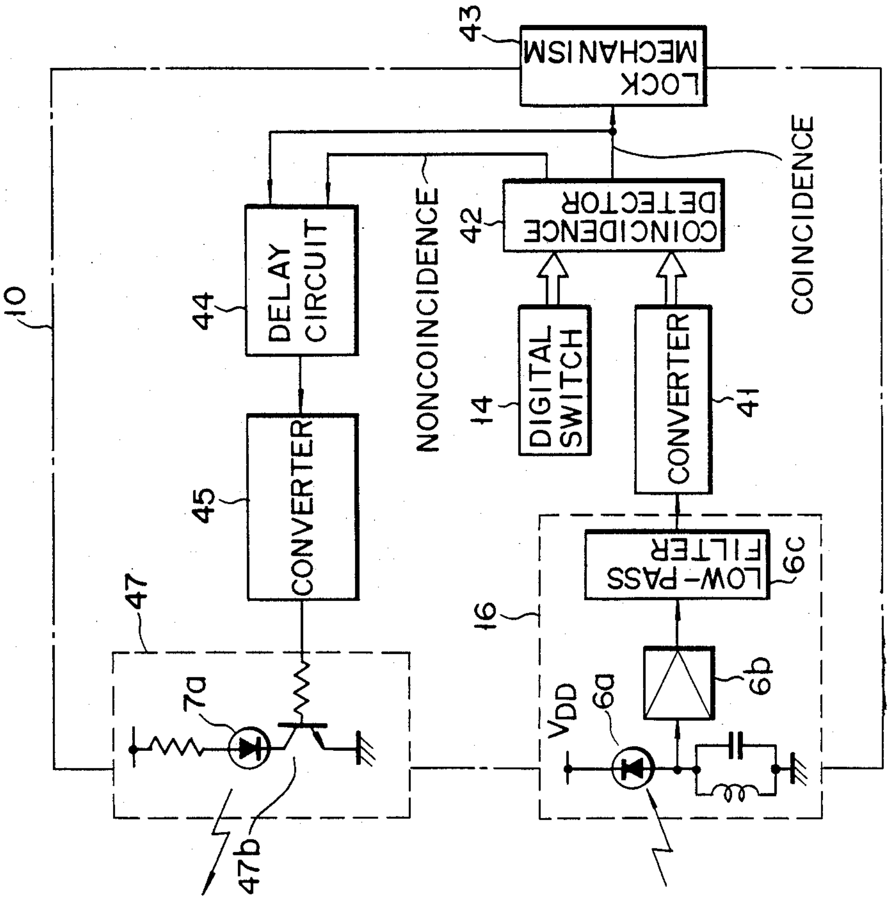
FIG. 20 is a circuit diagram of the jewel box shown in FIG. 18.

FIG. 20 shows the circuit configuration of jewel box 10. Reference numeral 16 denotes a receiver. Receiver 16 comprises photodiode 6a, shown in FIG. 18, amplifier 6b, low-pass filter 6c, and the like, and receives a light signal from LED 4a, to convert it into an electrical signal. Reference numeral 41 denotes a converter. Converter 41 converts an output signal from receiver 16 into a parallel digital signal (encrypted code). Coincidence detector 42 compares an encrypted code set by digital switches 14, and an encrypted code output from converter 41. When detector 42 detects a coincidence therebetween, it generates a coincidence signal; otherwise, it generates a noncoincidence signal. Lock mechanism 43 comprises projection 13 and an engagement portion of casing 11, shown in FIG. 18. When mechanism 43 receives the coincidence signal, projection 13 and the engagement portion are disengaged, and the lock is released.

The coincidence or noncoincidence signal is delayed by delay circuit 44, and is then sent to converter 45. Converter 45 converts the coincidence or noncoincidence signal into a serial ON or OFF signal, and sends it to transmitter 47. Transmitter 47 comprises LED 7a, shown in FIG. 18, and transistor 47b, and converts the output signal from converter 45 as a response signal, into a light signal and then outputs it. The response signal is received by receiver 5 of the wristwatch, as is described above.

Figure 21:
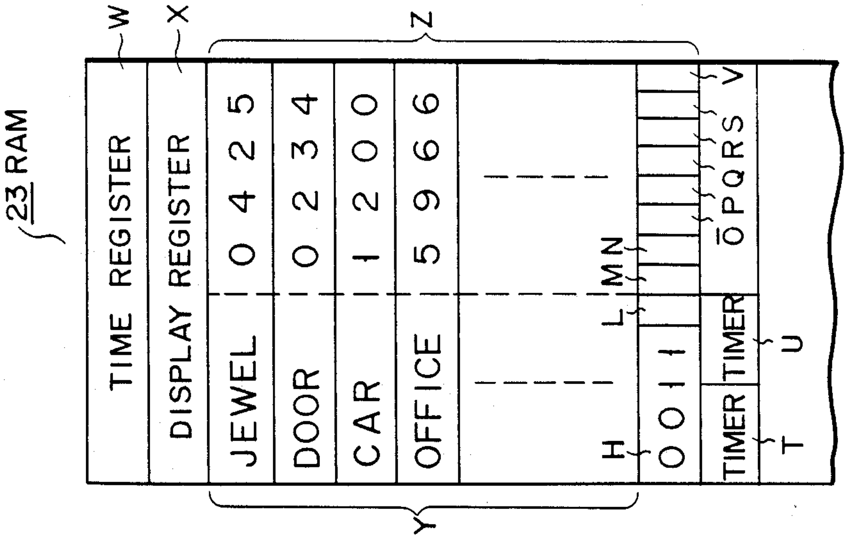
FIG. 21 is an internal memory map of RAM 23 shown in FIG. 19.

FIG. 21 shows a memory map of RAM 23, shown in FIG. 19. Referring to FIG. 21, RAM 23 comprises time register W, display register X, item storage register Y, encrypted-code storage register Z, password data storage register H, password data-set flag L, electronic key-operation mode flag M, password data-input mode flag N, mode-selection flag $\overline{O}$, password data-update mode flag P, item/code-update/set flag Q, item-input mode flag R, code-output mode flag S, status-display mode flag V, timers T and U, and the like.

Time register W stores time data, i.e., hour, minute, second, and 1/16 sec data, and display register X temporarily stores data displayed in display section 2. Item storage register Y and encrypted-code storage register Z each comprise a plurality of registers, which store items corresponding to various electronic locks or encrypted codes set for each item. For example, an item corresponding to jewel box 10 is set to be "JEWEL", and an encrypted code corresponding thereto is set to be, for example, "0425". Items for doors of a house, a vehicle, and an office are set to be "DOOR", "CAR", and "OFFICE", and encrypted codes therefor are set in correspondence therewith. Password data storage register H stores password data, i.e., data including a secret number or symbol which is known to a specific person, and stores, for example, password data "0011".

Password data-set flag L is set to be "1" when password data is set in register H. Electronic key-operation mode flag M is set to be "1" when a display mode associated with the operation of the electronic key (an electronic key-operation mode; to be described later), other than a time-display mode, is selected. Password data-input mode flag N, mode-selection flag O, password data-update mode flag P, item/code-update/set flag Q, item input mode flag R, code output-mode flag S, and status-display mode flag V are set to be "1" when the display mode of display section 2 is in the password data-input mode, the mode-selection mode, the password data-update mode, the item/code-update/set mode, the item input-mode, the code-output mode, and the status-display mode, respectively. Timers T and U measure time in units of seconds. The measurement result of timer T serves as a timing signal for automatically switching predetermined display modes, and the measurement result of timer U is used to judge the presence/absence of the response signal from jewel box 10.

The operation of the apparatus shown in FIGS. 17 through 21 will now be described with reference to flow charts.

The same general flow as that shown in FIG. 5 can be adopted, and the flow charts showing the processing when switches S1, S2, S3, S4, S5, and S6 are pressed, are the same as those shown in FIGS. 6, 8, 9, 10, 11, and 12. The difference from the first embodiment shown in FIGS. 1 through 16, is that mode-detection processing, and display processing in steps h2 and h3, in FIG. 13, are executed as shown in FIGS. 22A and 22B instead as in FIGS. 15A and 15B.

Figure 22A:
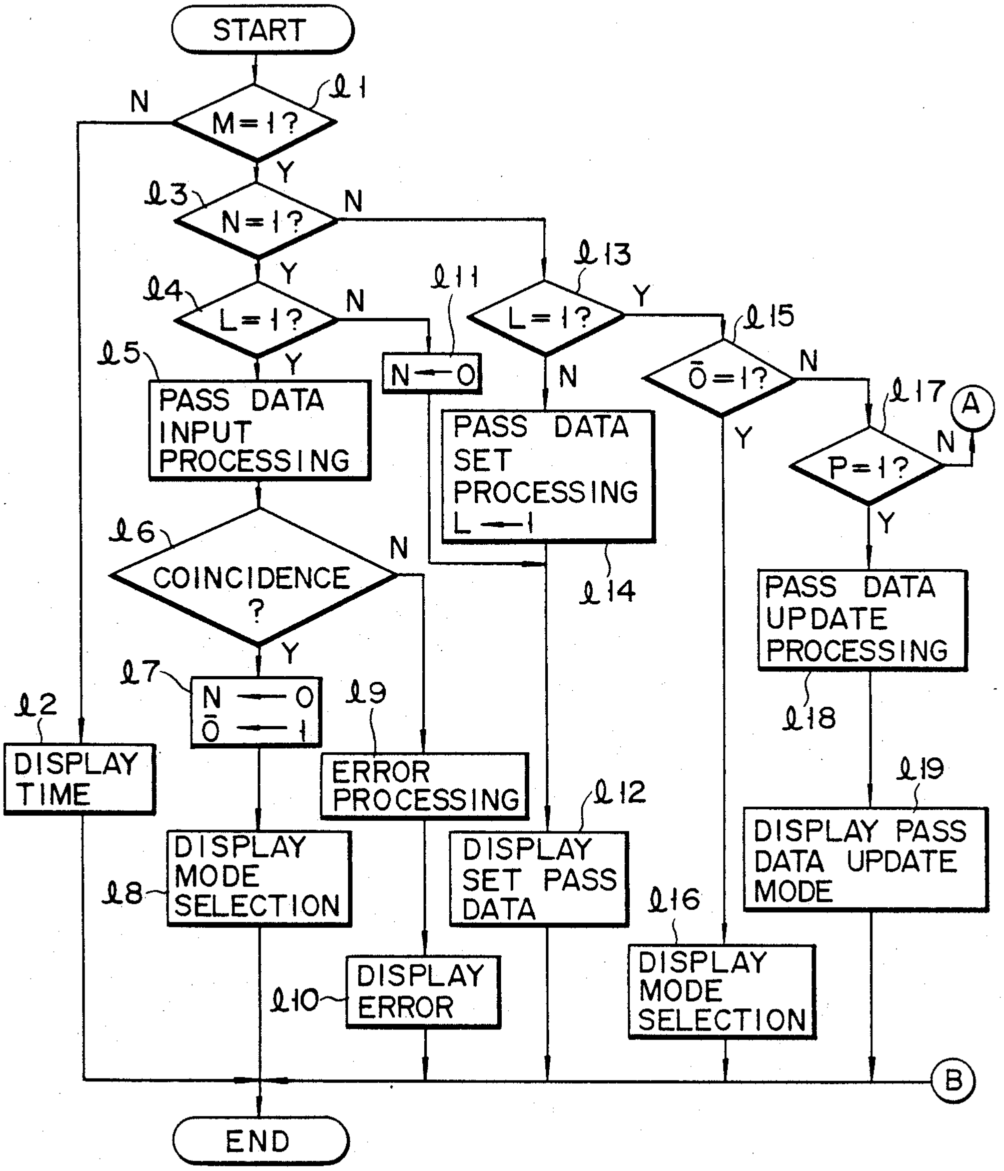
FIGS. 22A through 22C are flow charts showing the operation of the wristwatch shown in FIG. 17.
Figure 22B:
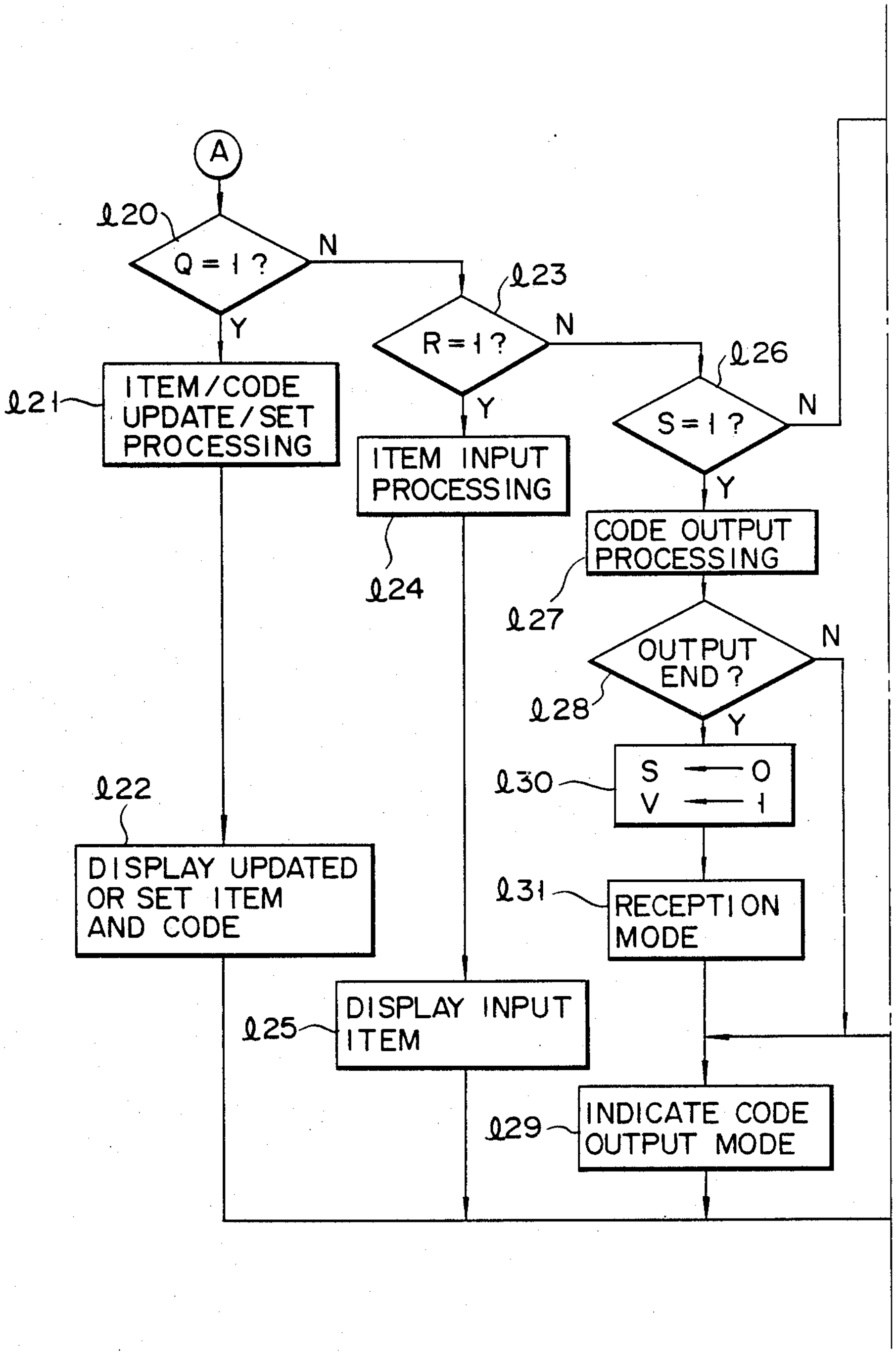
Figure 22C:
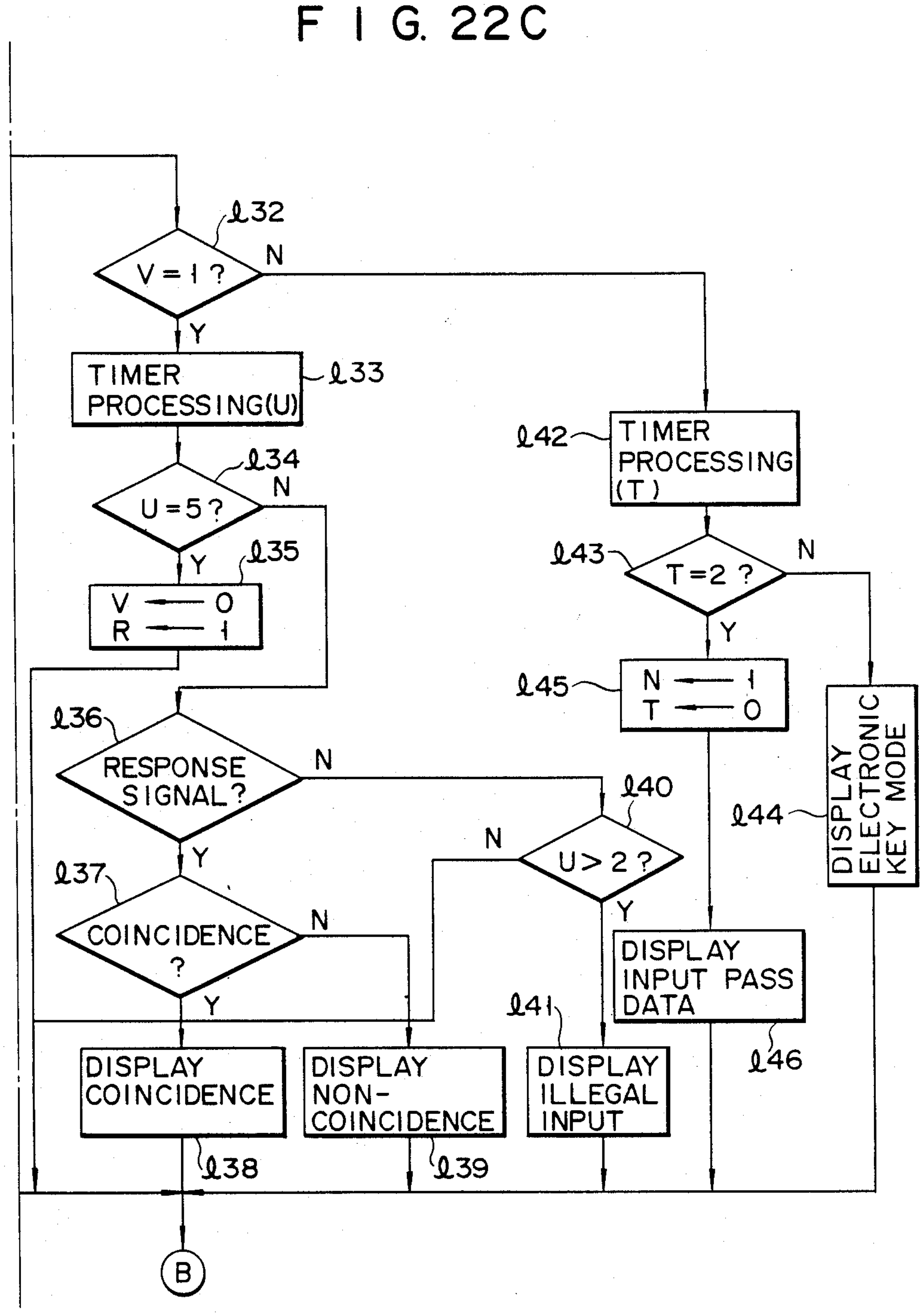

Referring to FIG. 22A, it is checked, in step l1, if electronic key-operation mode flag M is "1". If M≠1, time data is displayed, in step l2. The time-display step is performed such that time data written in time register W in RAM 23 is temporarily written in display register X, and is then displayed in display section 2. FIG. 23A shows this display state.

If M=1, in step l1, it is checked, in step l3., f password data-input mode flag N is "1". If N=1, it is checked, in step l4, if password data-set flag L is "1", i.e., if password data has already been set. If L=1, password data-input processing is executed, in step l5, and it is then checked, in step l6, if the preset password data coincides with input password data. If a coincidence is found therebetween, flag N is set to be "0" and mode-selection flag O is set to be "1", in step l7, thereby switching the display mode to mode-selection mode m6. Then, mode-selection display is performed, in step 8.

However, if a noncoincidence is found between the preset and input password data, in step l6, error processing is executed, in step l9, and error display is performed, in step l10. If L≠1, in step l4, flag N is set to be "0", in step l11, to switch the display mode to password data-set mode m4, thus displaying set password data, in step l12.

If N≠1, in step l3, it is checked, in step l13, if L=1. If L≠1, since password data-set mode m4 is selected, password data-set processing is executed and flag L is set to be "1", in step l14. The set password data is displayed, in step l12.

If L=1, in step l13, it is checked, in step l15 if flag O is "1". If $\overline{O}$=1, mode selection display is made in step l16.

However, if $\overline{O}$≠1 in step l15, it is checked in step l17, if flag P is "1". If P=1, password data-update processing is executed, in step l18, and updated password data is displayed, in step l19.

If P≠1, in step l17, it is checked, in step l20, in FIG. 22B, if item/code-update/set flag Q is "1". If Q=1, update/set processing for an item and an encrypted code is executed, in step l21, and the updated or set item and encrypted code are displayed, in step l22.

If Q≠1, in step l20, it is checked, in step l23, if item-input mode flag R is "1". If R=1, item-input processing is executed, in step l24. This processing is executed such that input item data is written in register X. Next, the item data, written in register X, is displayed, in step l25.

If R≠1, in step l23, it is checked, in step l26, if code-output mode flag S is "1". If S=1, an encrypted code corresponding to the item input in step 24 is sent to converter 29, shown in FIG. 19, and LED 4*a* is driven, in step l27. It is checked, in step l28, if the output operation of the encrypted code is completed. If the encrypted code is being output, a code-output mode is displayed, in step l29. The encrypted code is output as a light signal from LED 4*a*, shown in FIG. 19, and is received by photodiode 6*a* of jewel box 10, shown in FIG. 10. If the number set by digital switches 14 coincides with the encrypted code, the lock is released. If it is detected, in step l28, that the output operation of the encrypted code is completed, flag S is set to be "0", and status-display mode flag V is set to be "1", in step l30. Then, processing for switching to a reception mode, for receiving the response signal from jewel box 10, is executed, in step l31.

If S=1, in step l26, it is checked, in step l32, if flag V is "1", i.e., if the reception mode is set. If V=1, timer U is started, in step l33, and thereafter, it is checked, in step l34, if timer U has counted five, i.e., if five seconds have passed. If U=5, the flow advances to step l35, the reception mode is ended, flag V is set to be "0", and flag R is set to be "1".

If U=5, in step l33, i.e., if five seconds have not yet passed from start of timer U, the presence/absence of the response signal from jewel box 10 is checked, in step l36. If the response signal is present, it is checked, in step l37, if the response signal is a coincidence signal, i.e., if the response signal is a signal indicating that the transmitted encrypted code coincides with the encrypted code set by digital switches 14. If the coincidence signal is received, coincidence display is performed, in step 138. However, if a noncoincidence signal is received, noncoincidence display is performed in step 139.

If no response signal is detected in step 136, it is checked, in step 140, if timer U is larger than 2, i.e., two seconds have passed. If U>2, it is determined that returning of the response signal is too late, and illegal input display is performed, in step 141. However, if U<2, the code-output mode is displayed to await the response signal in step 129.

If V≠1, in step 132, this signifies that the display mode has just been switched from time-display mode m1 to electronic key mode m2. In this case, timer processing is executed by timer T, in RAM 23 shown in FIG. 21, in step 142, and it is then checked, in step 143, if two seconds have passed. If two seconds have not yet passed, in timer T, the electronic key mode is displayed, in step 144. However, if two seconds have passed, timer T is reset and password data-input mode flag N is set to be "1", in step 145, thereby displaying input password data, in step 146.

A change in display mode upon operation of switches S1 through S6 will now be explained with reference to FIG. 23 and FIGS. 24A through 24I.

Figure 23:
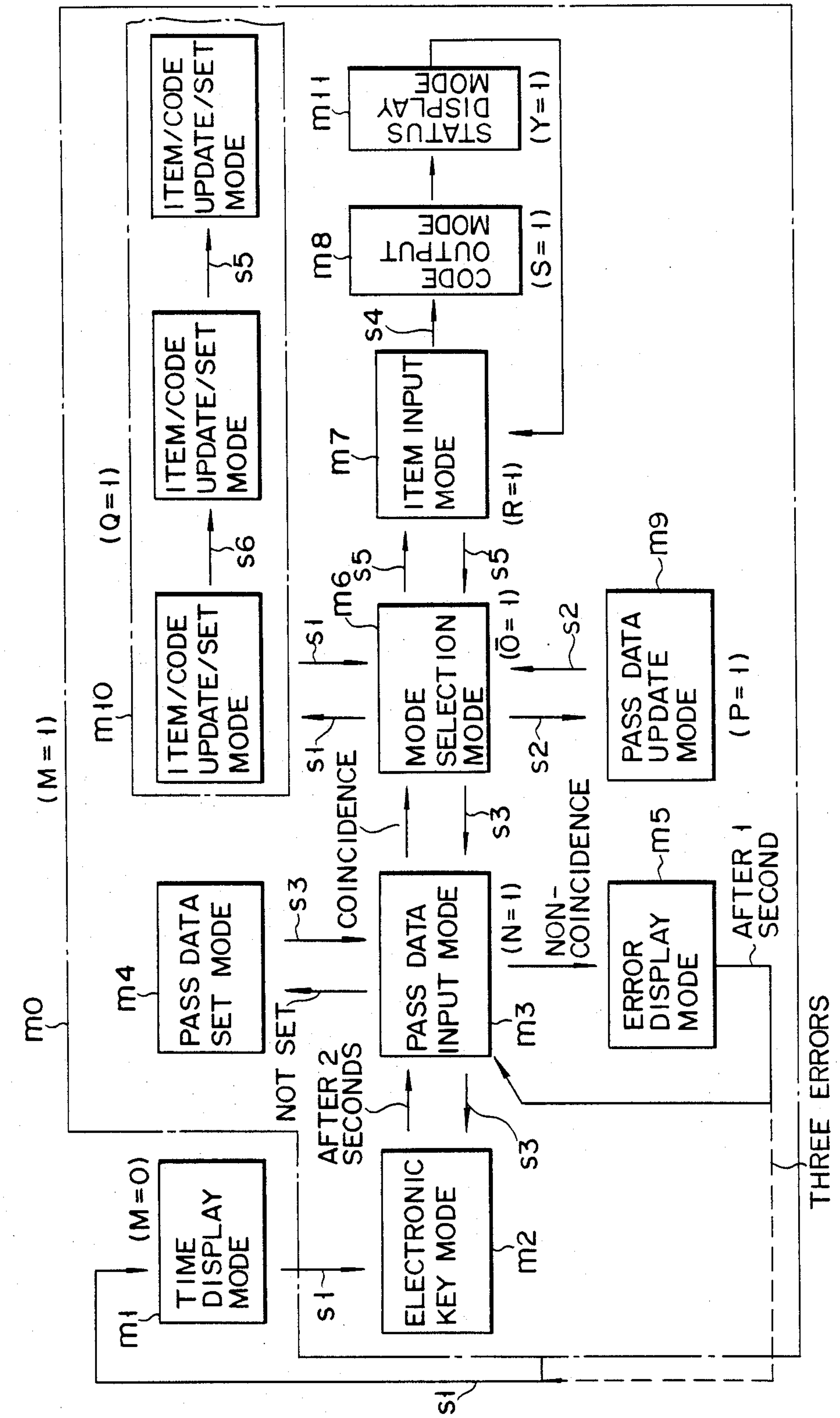
FIG. 23 is a diagram showing a change of display mode upon depression of keys of the wristwatch shown in FIG. 17.
Figure 24A:
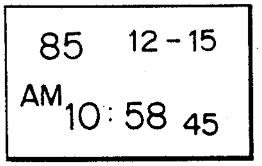
FIGS. 24A through 24I are representations showing display states of a display section, in the respective modes.
Figure 24B:
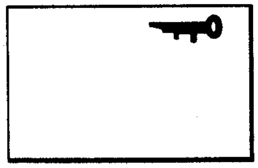

In the state of time-display mode m1, in FIG. 23, time data is displayed as shown in FIG. 24A. When the electronic key is to be used in this state, switch S1 is depressed. Thus, the display mode is switched to electronic key mode m2, and the electronic key is displayed as shown in FIG. 24B.

Figure 24C:
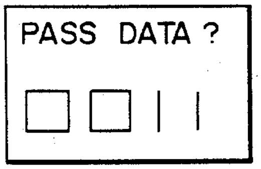

Two seconds after mode m2 is set, the display mode is switched to password data-input mode m3. When password data, for example, "0011", is input in this state, the input password data is displayed as shown in FIG. 24C. Only when the input password data coincides with preset password data, is the display mode switched to mode selection mode m6. If a noncoincidence is found therebetween, the display mode is switched to error-display mode m5, thus signaling an error. Thereafter, when one second has passed, the displayed mode is switched again to password data-input mode m3. However, if password data is erroneously input three times, the display mode is returned to time-display mode m1. In this manner, a person who does not know preset password data cannot use the electronic key, i.e., cannot output an encrypted code, update or set an item and an encrypted code, nor update password data. Note that if password data is not set, the display mode is switched to password data-set mode m4. Therefore, if the user depresses switch S3 after he sets desired password data, the display mode is switched to password data-input mode m3.

Figure 24D:
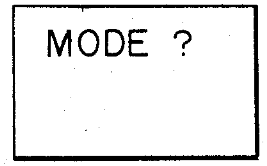
Figure 24E:
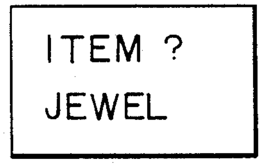
Figure 24F:
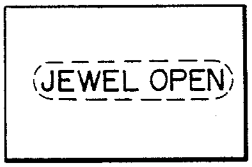
Figure 24G:
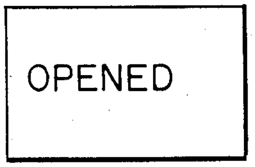
Figure 24H:
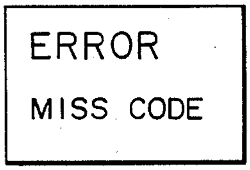
Figure 24I:
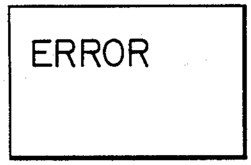

When a coincidence is found between input and preset password data and the display mode is switched to mode-selection mode m6, the display shown in FIG. 24D is performed. In this state, if the user unlocks the electronic lock, he depresses switch S5. Then, the display mode is switched to item-input mode m7. In this state, when the user inputs an item corresponding to a desired electronic lock, for example, "JEWEL" for a jewel box, the input item is displayed as shown in FIG. 24E. If the encrypted code is to be output, switch S4 is depressed after LED 4a and photodiode 5a, shown in FIG. 17, are aligned with with photodiode 6a and LED 7a, shown in FIG. 18. While the encrypted code is output, the display mode is switched to code-output mode m6, and the flickering display shown in FIG. 24F is performed. When the output operation of the encrypted code is completed, the display mode is switched to status-display mode m11, upon reception of the response signal from LED 7a of jewel box 10, and the coincidence display shown in FIG. 24G, the noncoincidence display shown in FIG. 24H, or the illegal-input display shown in FIG. 24I, is carried out. After the status display is completed, the display mode is again switched to item-input mode m7. In this way, each time an encrypted code is transmitted, the transmitted result can be displayed. Therefore, even if the lock is not released, the user can easily know if he has input an erroneously encrypted code or if he has transmitted an encrypted code in an erroneous manner.

If an item and an encrypted code are to be updated or set, the user depresses switch S1, in mode-selection mode m6. The display mode is then switched to item/-code-update/set mode m10, and the user can update or set the item and the encrypted code. Each time the user depresses switch S6, the items and the encrypted codes are sequentially switched. If the user depresses switch S1 again, the display mode is returned to mode-selection mode m6.

When the user wants to update password data, he depresses key S2, in mode-selection mode m6. Since the display mode is switched to password data-update mode m9, he can update password data in this state. When mode-selection mode m6 is to be resumed, the user need only depress switch S2.

According to the present invention, in the first embodiment shown in FIGS. 1 through 16 and in the second embodiment shown in FIGS. 17 through 24I, an item corresponding to an encrypted code to be output, for example, "JEWEL" for a jewel box, is input, and the encrypted code corresponding thereto is output.

However, each time the lock is released, the item must be input, in order to output the encrypted code, thereby resulting in very cumbersome mode of operation.

The above drawback is eliminated in an embodiment described below and shown in FIGS. 25 and 26.

Figure 25:
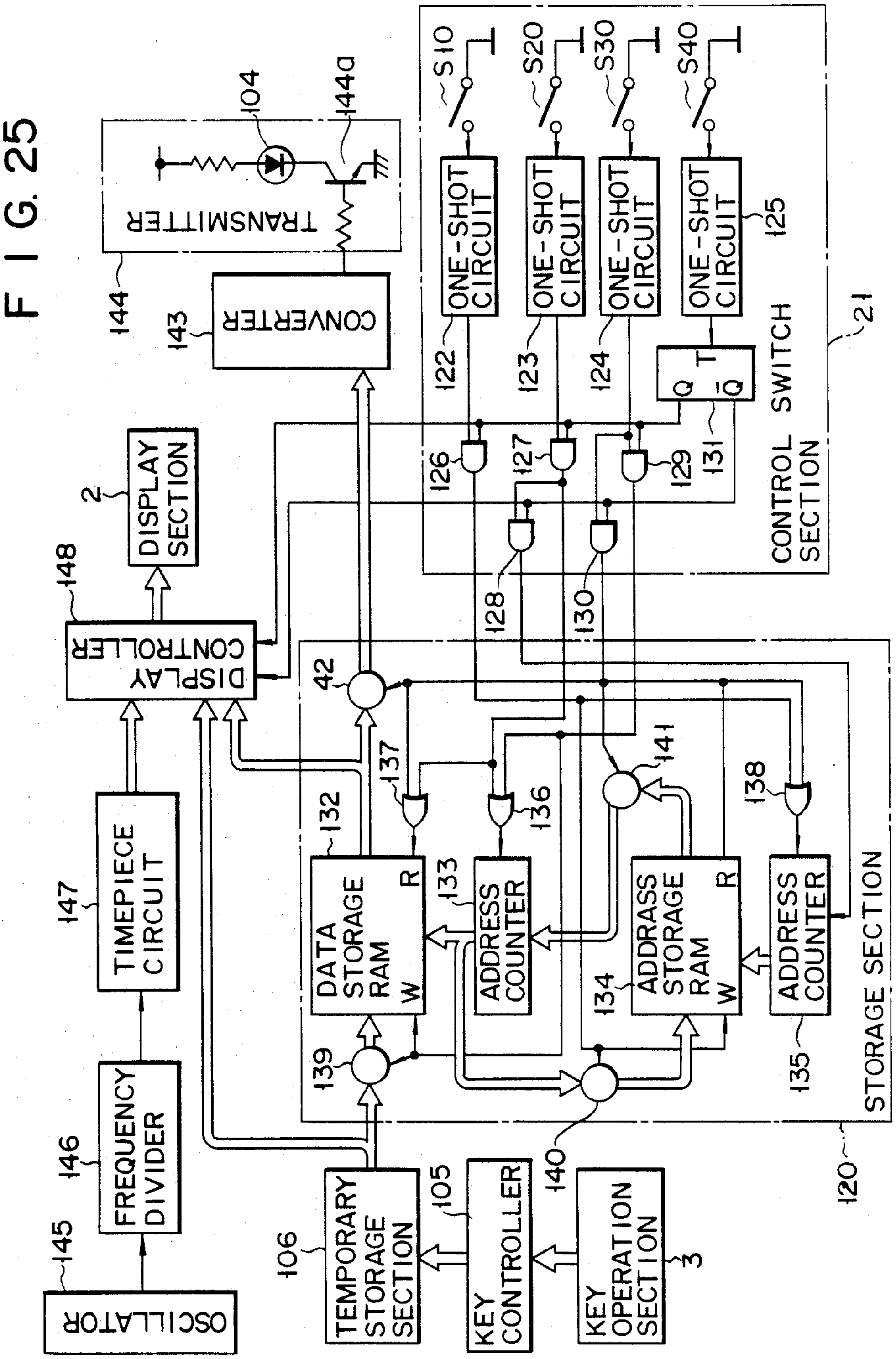
FIG. 25 is a circuit diagram showing another embodiment of the present invention.

FIG. 25 shows the circuit configuration of wristwatch casing 1, shown in FIG. 1. The circuit shown in FIG. 25 includes the same key-operation section 3 as that shown in FIG. 1, with which a desired item (for example, "JEWEL" for a jewel box) and a corresponding encrypted code (e.g., "0425") can be input by operating switches. The input item and the encrypted code are stored in temporary storage section 106, by means of key controller 105.

In control switch section 121, one-shot circuits 122, 123, 124, and 125 are respectively connected to switches S10, S20, S30, and S40, and each time switch S10, S20, S30, or S40 is turned on, one pulse is generated from corresponding one-shot circuit 122, 123, 124, or 125. The output of one-shot circuit 122 is supplied to AND gate 126, the output of one-shot circuit 123 is supplied to AND gates 127 and 128, the output of one-shot circuit 124 is supplied to AND gates 129 and 130, and the output of one-shot circuit 125 is supplied to input terminal T of trigger flip-flop 131. Set output Q of flip-flop 131 is supplied to the other input terminals of AND gates 126, 127, and 129, and reset output $\overline{Q}$ thereof is supplied to the other input terminals of AND gates 128 and 130. In addition, outputs Q and $\overline{Q}$ are also supplied to display controller 148.

Storage section 120 comprises data storage RAM 132 for storing an item and a corresponding encrypted code, and address storage RAM 134 for storing the sending order of the encrypted codes stored in RAM 132. Read/write addresses of RAMs 132 and 134 are specified by address counters 133 and 135, respectively.

The output of AND gate 129 is supplied to address counter 133 via OR gate 136, is also supplied to gate 139 as a gate signal, and is supplied to RAM 132 as a W signal (write signal). Therefore, when flip-flop 131 is in the set state, if switch S30 is operated to output an H (High)-level signal from AND gate 129, address counter 133 is incremented by one, and the item and the encrypted code stored in temporary storage section 106 are written at addresses of RAM 132 designated by counter 133 via gate 139. The output of AND gate 127 is supplied to address counter 133 via OR gate 136, and is also supplied to RAM 132 as an R signal (read signal), via OR gate 137. Therefore, when flip-flop 131 is in the set state, if switch S20 is turned on to generate an H-level signal from AND gate 127, address counter 133 is incremented by one, and the item and the encrypted code written at addresses of RAM 132 designated by counter 133 are read out therefrom.

The output of AND gate 126 is input to address counter 135 via OR gate 138, and is also input to gate 140 as a gate signal. In addition, the output of AND gate 126 is also input to RAM 134 as a W signal. Therefore, when flip-flop 131 is in the set state, if switch S10 is turned on and an H-level signal is output from AND gate 126, address counter 135 is incremented by one, and address data of address counter 133 is written, via gate 140, at addresses of RAM 134 designated by counter 135.

The output of AND gate 130 is input to address counter 135 via OR gate 138, is input to gates 141 and 142 as a gate signal, and is also input to RAMs 134 and 132 as an R signal. Therefore, when flip-flop 131 is in the reset state, if switch S30 is turned on and an H-level signal is output from AND gate 130, address counter 135 is incremented by one, and address data written at an address of RAM 134 designated by counter 135 is read out therefrom and is preset in address counter 133 via gate 141. The item and the encrypted code written at addresses of RAM 132 designated by preset address counter 133 are read out therefrom and are sent to converter 143 via gate 142. The output of AND gate 128 is input to the clear terminal of address counter 135. Therefore, when switch S20 is turned on and an H-level signal is generated from AND gate 128 while flip-flop 131 is reset, and counter 135 is cleared.

In converter 143, the encrypted code read out from RAM 132 is converted into an H (High)-level or L (Low)-level serial electrical signal, and is supplied to transmitter 144. In transmitter 144, transistor **144*a* is turned on and off in accordance with the output signal from converter 143, and LED 104** is turned on and off accordingly, thereby converting the encrypted code into a light signal and sending it out.

A clock signal having a given period is generated from oscillator 145, and is frequency-divided by frequency divider 146 to a predetermined frequency. The frequency-divided signal is converted to time data, for example, second, minute, and hour data, by timepiece circuit 147, and is then output therefrom. The time data output from circuit 147, the item and encrypted code stored in section 106, and the item and the encrypted code read out from RAM 132 are sent to display controller 148, and are switched in accordance with the output from flip-flop 131, to be displayed in display section 2. The same display section 2 as that shown in FIG. 1, is adopted.

A key operation for storing items and encrypted code and for programming their sending order in the circuit described above will now be described below.

In order to store a desired item and encrypted code, switch S40 is operated to set flip-flop 131 ($Q=1$, $\overline{Q}=0$), thus setting a write mode for the item and the encrypted code. In this state, key-operation section 3 is operated so that items (e.g., "JEWEL" for a jewel box, "CAR" for the door of a vehicle, "OFFICE" for the door of an office, etc.) and encrypted codes corresponding to these items (e.g., "0425", "0234", "1200", etc) are input and stored in temporary storage section 106. The items and the encrypted codes stored in section 106 are displayed in section 2. Switch S30 is then turned on to generate an H-level signal from AND gate 129, so that the items and the encrypted codes stored in section 106 are written in RAM 132. In this manner, when the above-mentioned operations of key-operation section 3 and switch S30 are repeated while flip-flop 131 is set, a large number of items and encrypted codes can be stored in RAM 132.

When the items and the encrypted codes stored by means of the above operation are to be confirmed, switch S20 is turned on successively. Thus, since an H-level signal is successively generated from AND gate 27, the stored items and encrypted codes are sequentially read out from RAM 132 and are displayed in section 2. Thus, the user can confirm all the data sequentially, by watching section 2, upon depression of switch S20. In this case, the data is simply displayed, but the encrypted code is not sent out.

In order to program the sending order of the stored encrypted codes, a desired item and encrypted code are displayed in section 2, upon depression of switch S20. Next, switch S10 is turned on to generate an H-level signal from AND gate 126, thereby storing the addresses of the item and the encrypted code displayed in section 2, in RAM 134. When switches S20 and S10 are repetitively operated as above, desired items and encrypted codes can be sequentially stored in RAM 134, in a desired order.

With the above operations, a large number of items and encrypted codes can be stored in RAM 132, and the addresses of desired ones can be stored in RAM 134, in the desired order. After the sending order is programmed as described above, in order to send out the encrypted codes in the programmed order, the following operation is performed:

First, switch S40 is operated to reset flip-flop 131 ($Q=0$, $\overline{Q}=1$), thus setting a read mode for items and encrypted codes. In this state, switch S30 is operated to generate an H-level signal from AND gate 130, thereby sequentially outputting address data stored in RAM 134. An encrypted code designated by the output address data is read out from RAM 132, and is transmitted from transmitter 144 via converter 143. In order to transmit the next encrypted code, the user need only turn on switch S30. An encrypted code designated by the next address data stored in RAM 134, is read out from RAM 132. Each time switch S30 is operated, the encrypted codes can be sent out in the order of the corresponding addresses stored in RAM 134.

When the content of the program is updated, switch S20 is operated while flip-flop 131 is reset, to clear address counter 135. Thereafter, as described above, flip-flop 131 is set, and switches S20 and S10 are repetitively operated to restore the encrypted codes in the desired sending order.

The sending order of desired items and encrypted codes of a large number of items and encrypted codes can be programmed, and encrypted codes can be sequentially transmitted in the programmed order, upon operation of single switch S30.

Figure 26:
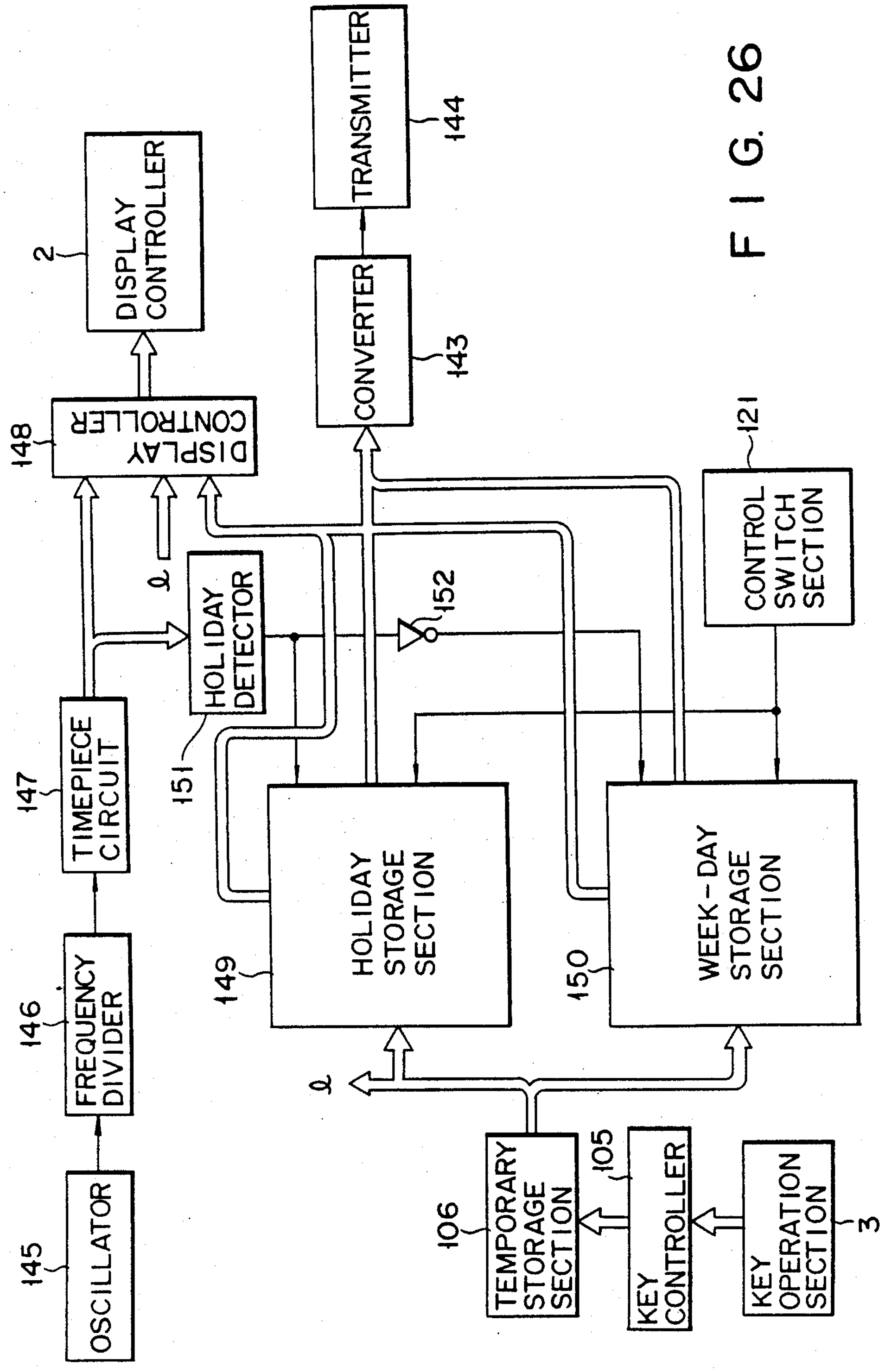
FIG. 26 is a circuit diagram showing still another embodiment of the present invention.

FIG. 26 is a block diagram according to another embodiment of the present invention. In this embodiment, the sending order of encrypted codes can be programmed separately for holidays and week days. In FIG. 25, single storage section 120 is provided. However, in FIG. 26, two storage sections 149 and 150, for holidays and week days, are provided. In addition, the circuit of this embodiment comprises holiday, detector 151, which generates an H-level signal during a holiday, in accordance with time data generated from timepiece circuit 147. In the encrypted code-read mode, holiday and week day storage sections 149 and 150 are selectively operated in accordance with the detection result from detector 151. More specifically, on a holiday, since the H-level signal is generated from detector 151, encrypted codes can be output from section 149 which receives the H-level signal. Meanwhile, on a week day, since an L-level signal is generated from holiday detector 151, encrypted codes can be output from section 150, to which the inverted signal of the L-level signal, i.e., an H-level signal, is supplied via inverter 152. The internal arrangements of storage sections 149 and 150 are the same as that of storage section 120 shown in FIG. 25, and they can store a plurality of items and encrypted codes, and their sending orders can be selected upon operation of switches of control switch section 121. Other arrangements in FIG. 26 are hhe same as those in FIG. 25, and a detailed description thereof will be omitted.

Referring to FIG. 26, the sending order for a holiday can be programmed in storage section 149, and the sending order for a week day can be programmed in storage section 150. In the encrypted code-read mode, encrypted codes can be sent out in accordance with the sending order stored in storage section 149 or 150. In this embodiment, since two separate storage sections are provided, the program need not be reset for each holiday, thus further simplifying the operation.

Two storage sections 149 and 150 can be switched by simultaneously depressing two switches instead of using detector 151. An interrupt function can be provided, so that another item and encrypted code can be input during the sending sequence, when another encrypted code is needed in addition to the programmed sending order.

FIGS. 27A and 27B and 28A and 28B show another embodiment of the present invention.

Figure 27A:
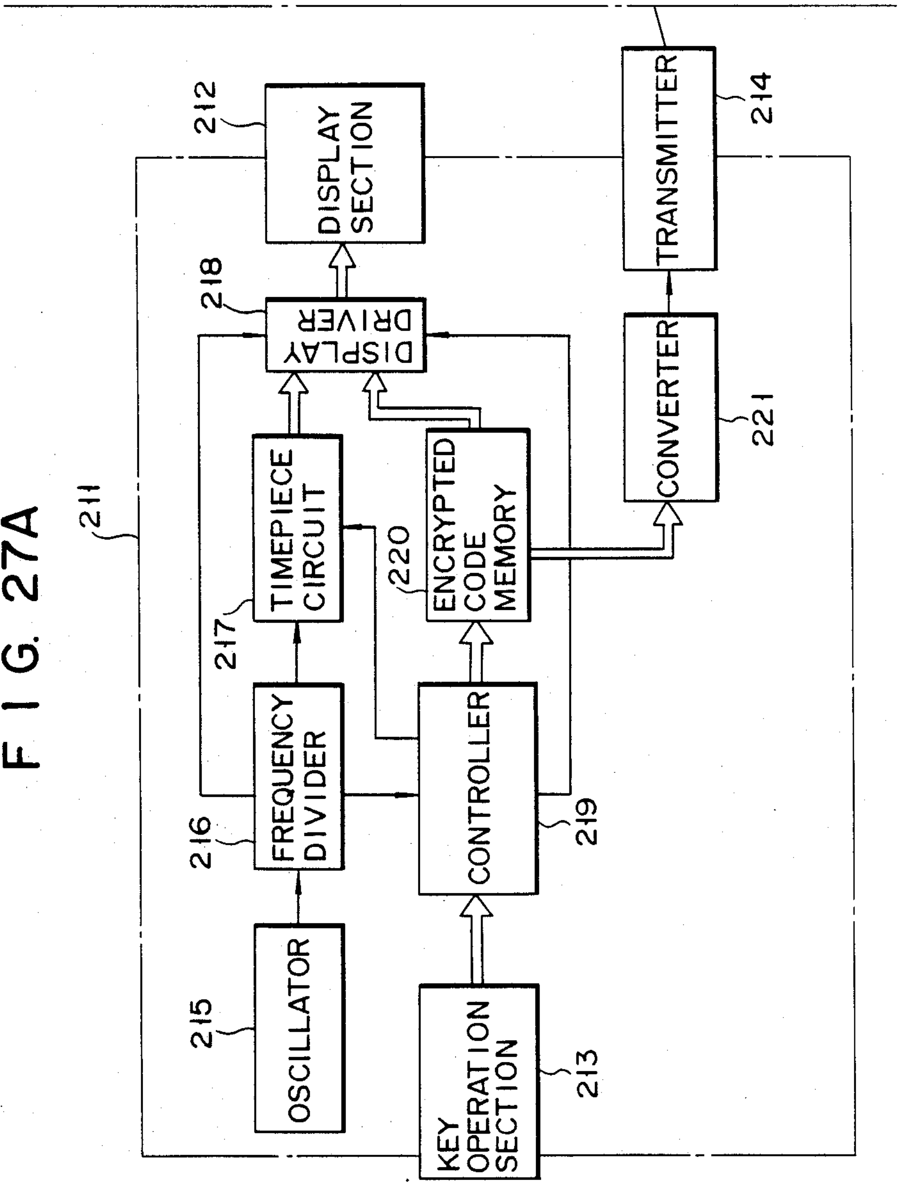
FIGS. 27A–27B are circuit diagrams showing still another embodiment of the present invention.
Figure 27B:
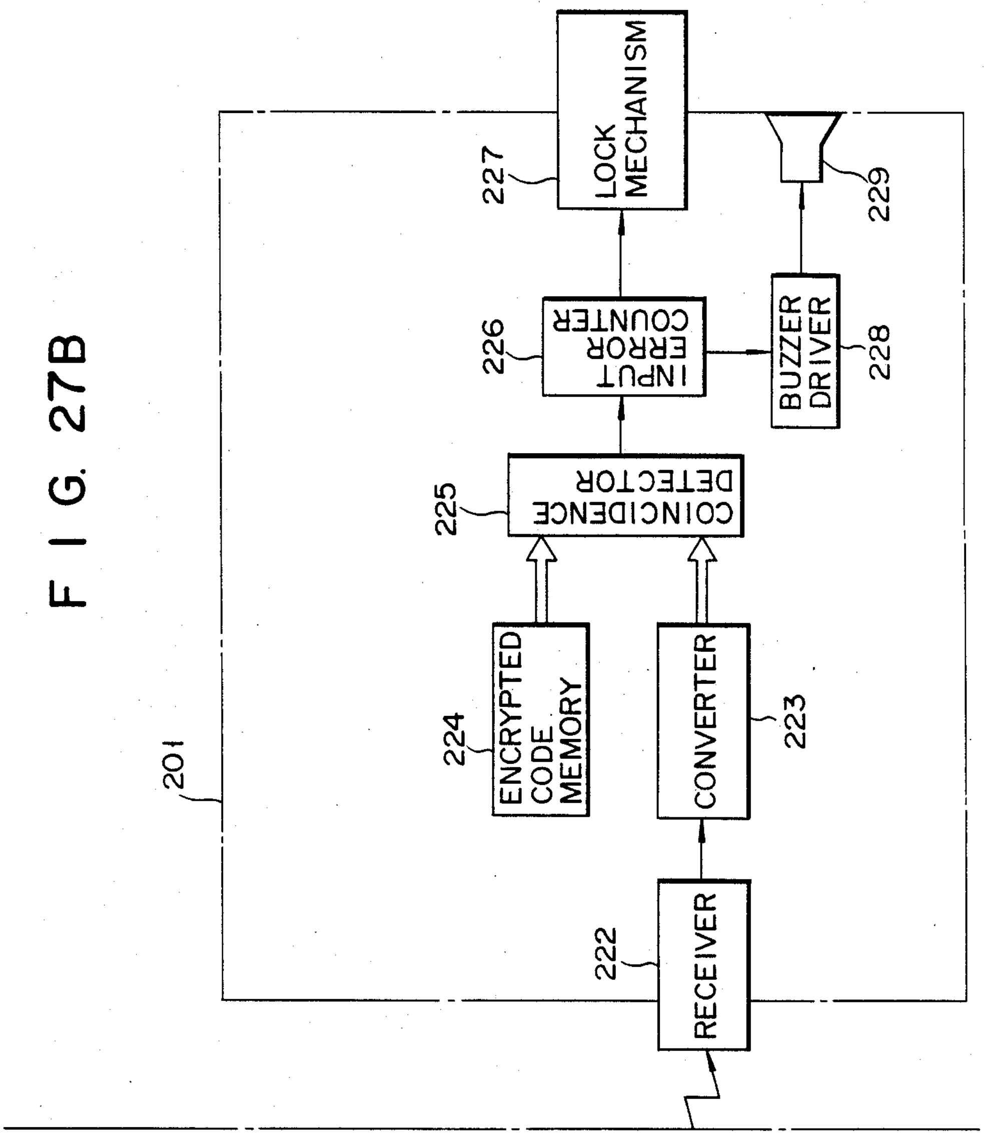

Referring to FIGS. 27A–27B reference numeral 211 denotes a wristwatch casing. In casing 211, a clock signal output from oscillator 215 is frequency-divided by frequency divider 216, and is converted to a signal having a 1/100-sec period. The 1/100-sec signal is supplied to timepiece circuit 217, display driver 218, and controller 219. In timepiece circuit 217, the 1/100-sec signal is converted to time data, for example, second, minute, and hour data, and the time data is displayed in display section 212, by driver 218. When an encrypted-code is input from key-operation section 213, the input encrypted code is temporarily stored in encrypted code memory 220, via controller 219. The encrypted code stored in memory 220 is displayed in section 212 by driver 218, and is converted to a serial transmission signal by converter 221. The transmission signal is supplied to transmitter 214, and is transmitted as a light signal by LED 214*a*.

Reference numeral 201 denotes a circuit diagram of a jewel box, which comprises receiver 222 including a photodiode, an amplifier, a low-pass filter, and the like. A light signal output from transmitter 214 is converted to a serial electrical signal by receiver 222. The serial electrical signal output from receiver 222 is converted to parallel data (encrypted code) by converter 223, and is temporarily latched.

Encrypted-code memory 224 stores a predetermined encrypted code. This encrypted code is compared with the encrypted code temporarily latched in converter 223 by coincidence-detector section 225. If a coincidence is found therebetween, an H (High)-level coincidence signal is generated; otherwise, an L (Low)-level noncoincidence signal is generated. These output signals are supplied to input-error counter section 226, and if the coincidence signal is input thereto, lock mechanism 227 is released. However, if the noncoincidence signal is input to counter section 226 a predetermined number of times or more, an alarm sound is generated from buzzer 229, by buzzer driver 228.

Coincidence-detector section 225, input-error counter section 226, and buzzer driver 228 will be described in more detail with reference to FIG. 28.

Figure 28A:
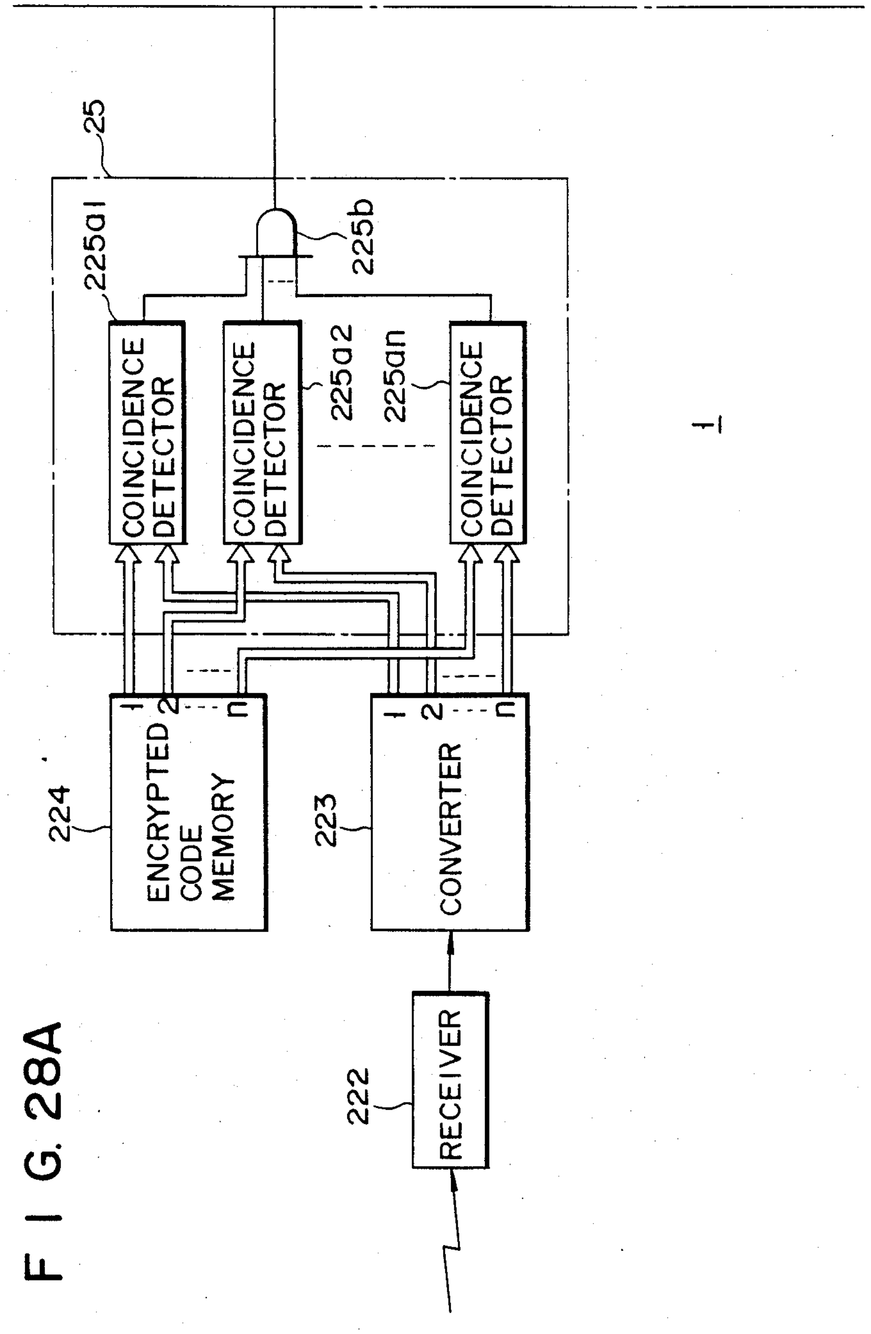
FIGS. 28A–28B are detailed circuit diagrams of the circuit configuration shown in FIG. 27.
Figure 28B:
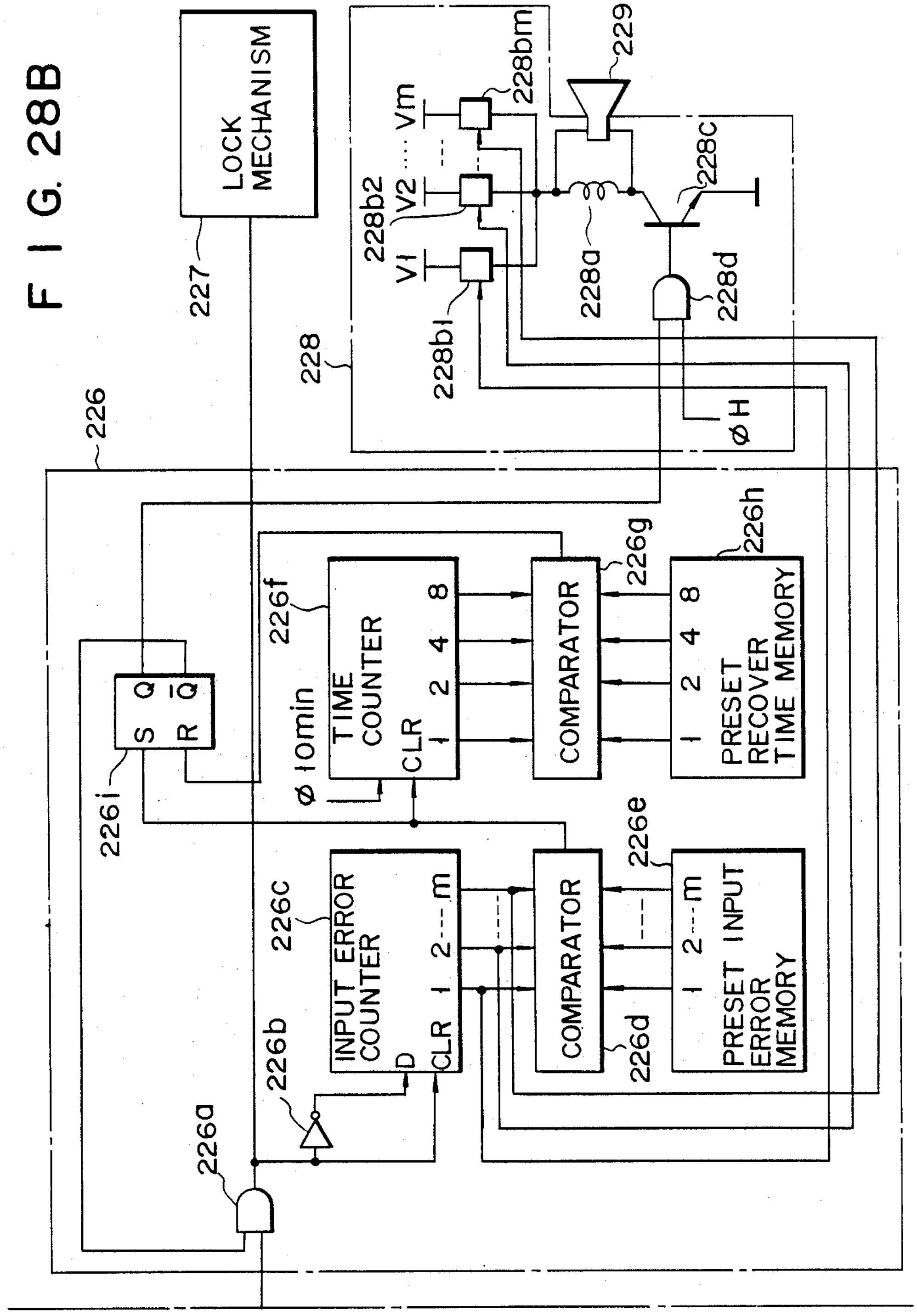

Referring to FIGS. 28A–28B, coincidence-detector section 225 comprises n coincidence-detectors 225*a*1 through 225*an*, corresponding to n code components constituting an encrypted code, and n-input AND gate 225*b* for inputting the outputs of all detectors 225*a*1 through 225*an*. In detectors 225*a*1 through 225*an*, encrypted codes respectively stored in memory 224 and converter 223 are compared and detected for each code component, and only when coincidences are found between all the components, is the coincidence signal output from AND gate 225*b*.

In input-error counter section 226, AND gate 226*a* receives the output of AND gate 225*b* and reset output $\overline{Q}$ of flip-flop 226*i*, and its output is supplied to clear terminal CLR of input-error counter 226*c*, and is also supplied to data terminal D of counter 226*c*, via inverter 226*b*. Counter 226*c* counts the number of H-level signals input to terminal D, i.e., the number of noncoincidence signals output from detector section 225. When the coincidence signal is input to terminal CLR via AND gate 226*a*, the count of counter 226*c* is cleared to zero. Preset input-error memory 226*e* can prestore a predetermined value. The predetermined value is compared with the count of counter 226*c*, by comparator 226*d*. When the count exceeds the predetermined value, an H-level signal is generated from comparator 226*d*. The output signal from comparator 226*d* is supplied to clear terminal CLR of time counter 226*f* and set input terminal S of flip-flop 226*i*.

Counter 226*f* counts clock signal $\phi$10MIN generated every 10 minutes from a clock generator (not shown). When the H-level signal is supplied to clear terminal CLR of counter 226*f*, the count of counter 226*f* is cleared, to restart the counting operation. Preset recover time memory 226*h* can store a value corresponding to a predetermined time. The value corresponding to the predetermined time is compared with the count of counter 226*f*, by comparator 226*g*. When the count exceeds the value corresponding to the predetermined time, an H-level signal is generated from comparator 226*g*. The output signal from comparator 226*g* is supplied to reset input terminal R of flip-flop 226*i*.

In buzzer driver 228, different voltages V1, V1, . . . , Vm (V1<V2<. . . <Vm) are switched by voltage switches 228*b*1, 228*b*2, . . . , 228*bm*, and are selectively applied to buzzer 229 and step-up coil 228*a*. Voltage switches 228*b*1, 228*b*2, . . . , 228*bm* are connected to the output terminals of counter 226*c* and are turned on in correspondence with the respective counts (1, 2, . . . , m). The other end of buzzer 229 is grounded via switching transistor 228*c*, which is turned on or off in accordance with an output signal from AND gate 228*d*. AND gate 228*d* receives set output Q from flip-flop 226*i* and clock signal φH from a clock generator (not shown).

In the above circuit configuration, when flip-flop 226*i* is in the set state, if a coincidence signal (H-level) is generated from coincidence-detector section 225, it passes through AND gate 226*a*, thereby releasing lock mechanism 227.

When a noncoincidence signal is generated from detector section 225 a number of times exceeding that stored in memory 226*e*, an H-level signal is generated from comparator 226*d*. In response to this, flip-flop 226*i* is set, and its reset output $\overline{Q}$ goes to L level. Therefore, since AND gate 226*a* is closed, lock mechanism 227 cannot be released. At the same time, since set output Q of flip-flop 226*i* goes to H level, clock signal φH passes through AND gate 228*d*, thus turning on and off transistor 228*c* for a given cycle. At this time, since voltage switch 228*b*1, 228*b*2, . . . , or 228*bm* corresponding to the count of counter 226*c* is turned on, corresponding voltage V1, V2, . . . , or Vm is applied to buzzer 229, thus generating an alarm sound having a volume corresponding to the applied voltage.

When a noncoincidence signal is further generated from detector section 225, since the count of counter 226*c* is incremented, the voltage switches corresponding to higher voltages are sequentially turned on. Therefore, the voltage applied to buzzer 229 is gradually increased, thereby increasing the volume of the alarm sound.

When the count of counter 226*c* has reached the predetermined value and the H-level signal is generated from comparator 226*d*, counter 226*f* is cleared, to restart its counting operation. Thereafter, when a predetermined time has passed and a counted time exceeds a time stored in memory 226*h*, an H-level signal is generated from comparator 226*g*. Then, since flip-flop 226*i* is reset, counter section 226 is recovered to a state wherein a coincidence signal from detector section 225 can pass through AND gate 226*a*, i.e., a state wherein lock mechanism 227 can be released. At this time, since set output Q of flip-flop 226*i* goes to L level, and AND gate 228*d* is closed, transistor 228*c* is turned off and the alarm sound of buzzer 229 is stopped.

The number of noncoincidences of an encrypted code as a condition for generating the alarm sound from buzzer 229, and a time interval during which the alarm sound is generated can be desirably changed by changing the contents of memories 226*e* and 226*h*. Therefore, a user himself can set the number of times and the time interval in consideration of security and operability.

In the above embodiment, the electronic lock apparatus is applied to the jewel box. The present invention is not limited to this, but can be various locks incorporated in doors of an office, a safe, and the like.

Figure 29:
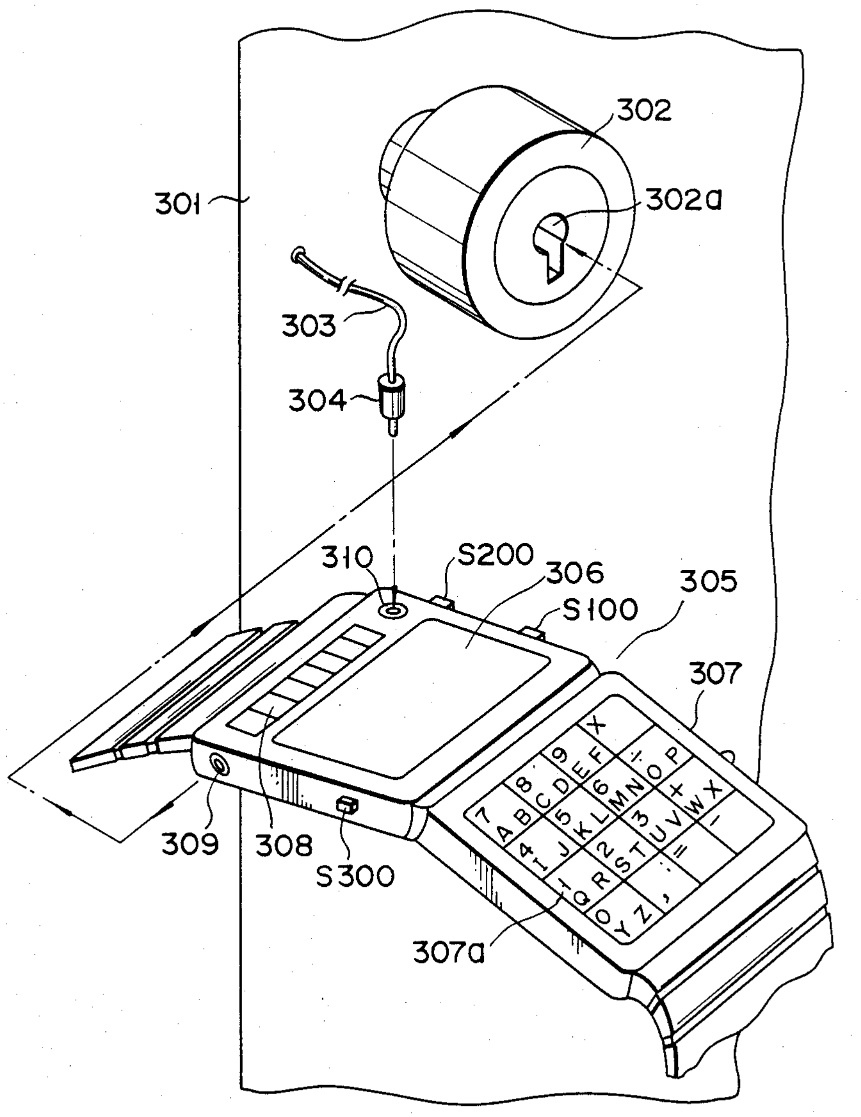
FIG. 29 is a perspective view showing still another embodiment of the present invention.
Figure 30:
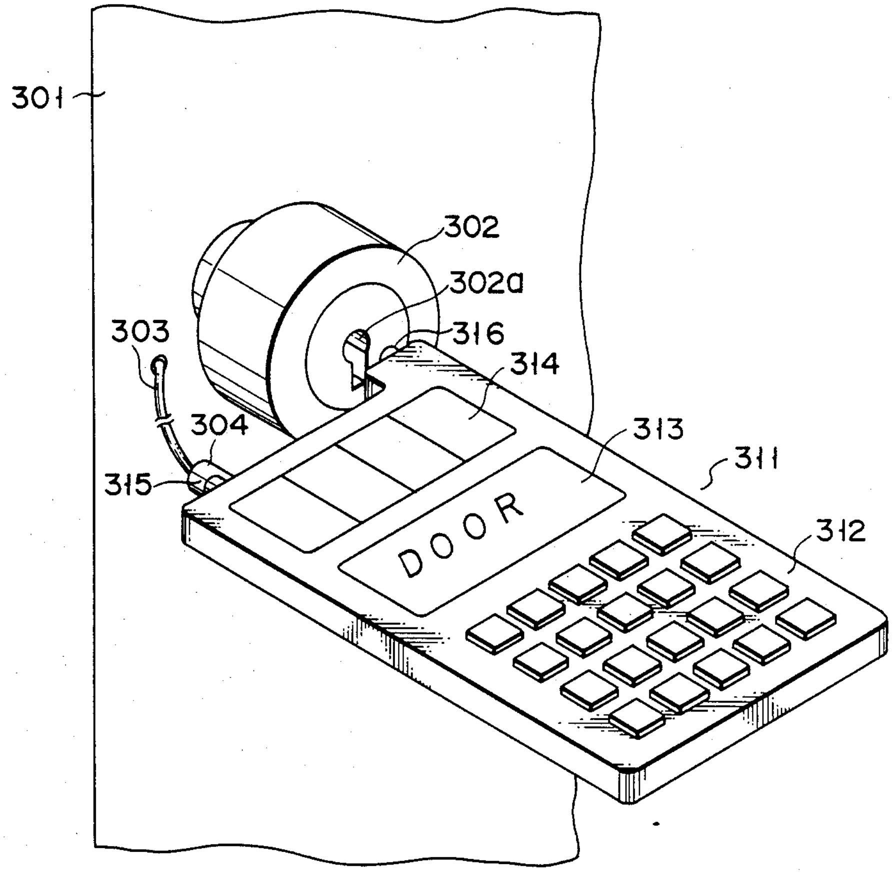
FIG. 30 is a perspective view showing still another embodiment of the present invention.

FIGS. 29 through 31 show another embodiment of the present invention.

FIG. 29 is a perspective view showing an embodiment in which the present invention is applied to a door lock apparatus and a wristwatch incorporating an electronic key apparatus for unlocking the lock apparatus.

Referring to FIG. 29, knob 302 is mounted on door 301. When a light signal including a predetermined encrypted code is received through key hole 302*a* formed at the center of knob 302, a lock mechanism (not shown) of door 301 is released by means of a circuit (to be described later). As a main feature of this embodiment, an output from a power source circuit for operating the circuit can be extracted to outside door 301 via cord 303 and power feed terminal 304 mounted at its distal end.

Wristwatch casing 305 incorporating the electronic key apparatus comprises display section 306 consisting of a liquid crystal display device, key-operation unit 307 including various keys 307*a*, solar cell 308, and the like. In addition, switches S100, S200, and S300 and LED 309 are arranged on the side end face of display section 306. These switches S100 through S300 and various keys 307*a* are operated when the display mode of display section 306 is switched or when an encrypted code is to be input, as described above. The encrypted code can be transmitted as a light signal from LED 309 when the lock mechanism of door 301 is released. Casing 305 comprises power-reception terminal 310 corresponding to power-feed terminal 304 of door 301. When the encrypted code is transmitted, terminal 304 can be inserted in terminal 310, thereby supplying the power source necessary for the circuit in casing 305, from the door 301 side.

FIG. 30 shows an embodiment in which an electronic key apparatus is incorporated in a compact electronic calculator. Referring to FIG. 30, electronic calculator 311 comprises key-operation section 312, display section 313, solar cell 314, and the like, and also comprises power-reception terminal 315 and LED 316, as in the wristwatch shown in FIG. 29. FIG. 30 illustrates a state wherein after power-feed terminal 304 is inserted in power-reception terminal 315, an encrypted code is transmitted from LED 316 through key hole 302*a*.

Figure 31A:
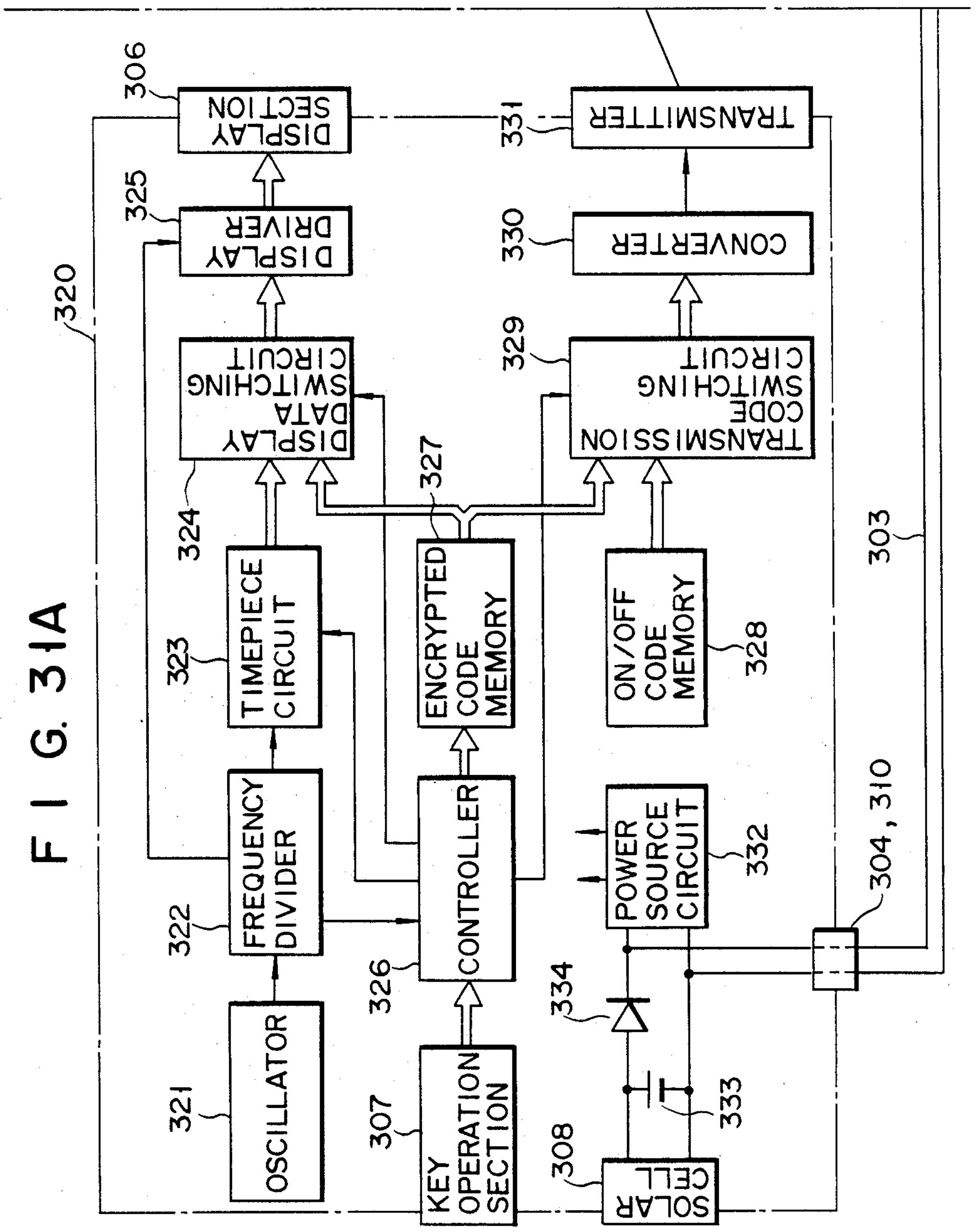
FIGS. 31A–31B are circuit diagrams of the embodiment shown in FIG. 29.
Figure 31B:
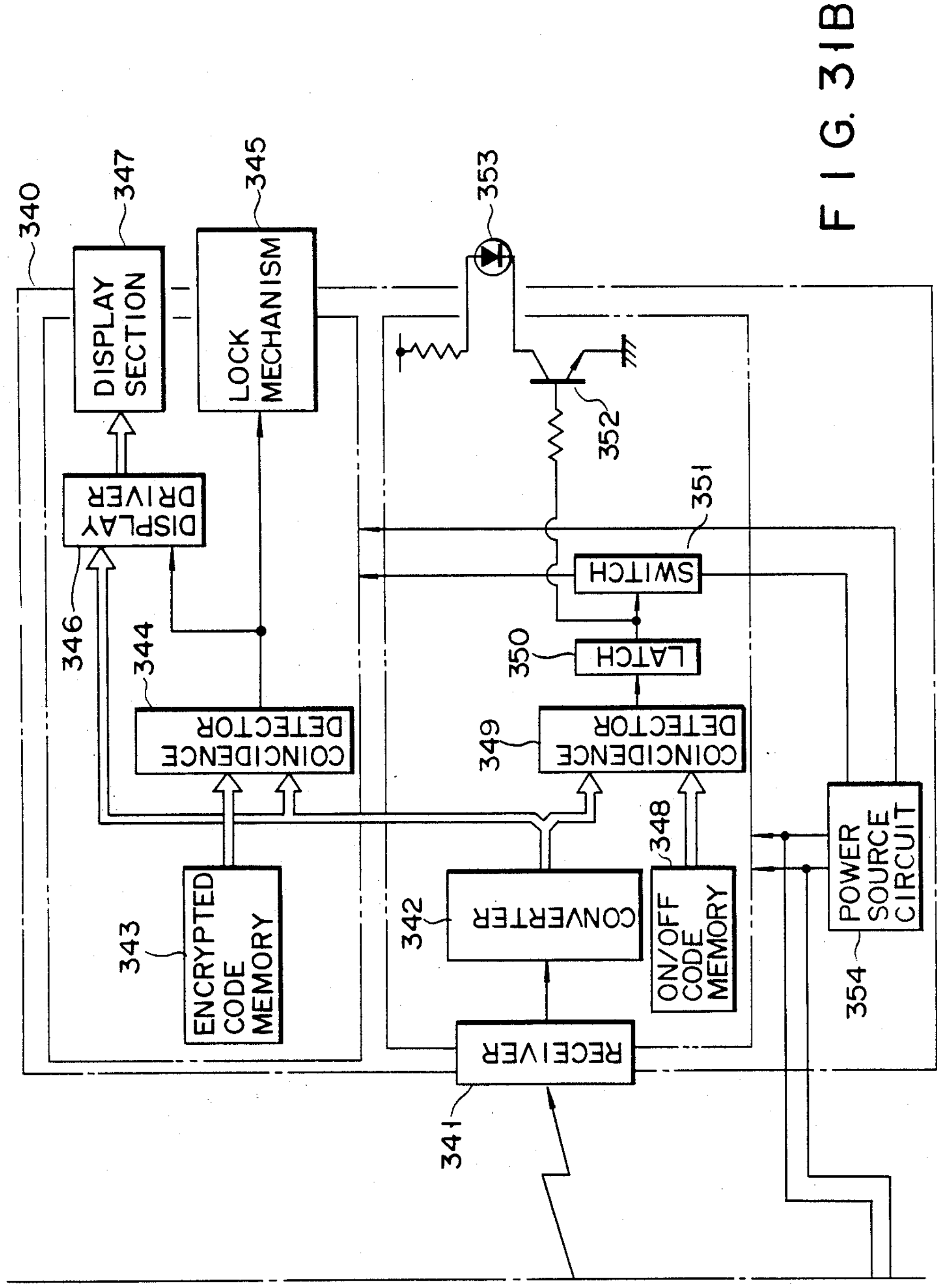

FIGS. 31A and 31B show the circuit configurations of the electronic lock apparatus incorporated in door 301 and the electronic key apparatus incorporated in wristwatch casing 305 in FIG. 29.

Referring to FIGS. 31A–31B, in electronic key apparatus 320, a clock signal output from oscillator 321 is frequency-divided by frequency-divider 322, to be converted to a 1/100-sec signal. The 1/100-sec signal is supplied to timepiece circuit 323, display driver 325, and controller 326. In timepiece circuit 323, the 1/100-sec signal is converted to time data, e.g., second, minute, and hour data, in accordance with an instruction from controller 326.

When an encrypted code is input from the key operation unit 307 such as that shown in FIG. 29, the encrypted code is temporarily stored in encrypted code memory 327, via controller 326. The encrypted-code stored in memory 327 and the time data output from timepiece circuit 323 are switched by display-data switching circuit 324, in accordance with an instruction from controller 326, and are selectively displayed in display section 306.

ON/OFF code memory 328 stores a predetermined code (to be referred to as an ON/OFF code hereinafter)

for turning on and off power source circuit 354 in electronic lock apparatus 340. The ON/OFF code and the encrypted code stored in memory 327 are switched by transmission-code switching circuit 329, and are selectively output to converter 330. These codes are converted to serial transmission signals by converter 330. The transmission signal is sent to transmitter 331 including LED 309 described above, and is transmitted as a light signal from LED 309.

Apparatus 320 comprises power source circuit 332 for supplying a constant power source to the circuit described above. Power from solar cell 308 and secondary dry cell 333, connected in parallel therewith, is supplied to power source circuit 332 via diode 334. Apparatus 320 comprises power-reception terminal 310, as shown in FIG. 29, and can receive power from power source circuit 354 at the electronic lock apparatus 340 side, via cord 303 and power-feed terminal 304.

Electronic lock apparatus 340 comprises receiver 341 consisting of a photodiode, an amplifier, a low-pass filter, and the like. The light signal emitted from transmitter 331 is converted to a serial electrical signal by receiver 341. Note that the photodiode is mounted inside key hole 302*a*, in FIG. 29, and can receive light propagating from an external circuit through key hole 302*a*. The serial electrical signal output from receiver 341 is converted to parallel data (encrypted code or ON/OFF code) by converter 342, and is temporarily latched thereby.

Encrypted-code memory 343 stores a predetermined encrypted code. As will be described later, only when the ON/OFF code is received, are the encrypted code stored in memory 343 and the encrypted code latched by converter 342 compared by coincidence detector 344. If a coincidence is found therebetween, a lock-release signal is output from detector 344, and lock mechanism 345 incorporated in door 301, in FIG. 29, is released. Note that the received encrypted code and the lock-release signal are displayed in display section 347, by display driver 346.

ON/OFF code memory 348 stores a predetermined ON/OFF code. The ON/OFF code stored in memory 348 is compared with the ON/OFF code, temporarily stored in converter 342, by coincidence detector 349. When a coincidence is found therebetween, a coincidence signal is generated from detector 349. The coincidence signal is latched by latch circuit 350, so that analog switch 351 and transistor 352 are turned on. Analog switch 351 is arranged between power source circuit 354, and coincidence detector 344, display driver 346, and the like. Switch 351 is normally in the OFF state, i.e., in the state wherein power is not supplied from power source circuit 354 to coincidence detector 344 and the like. As is described above, switch 351 is turned on only when the predetermined ON/OFF code is received. In this case, detector 344 and the like are enabled by power source circuit 354 and, at the same time, LED 353 is turned on, thus signaling that coincidence-detection of the encrypted code is enabled. Only when the encrypted code is received in this state, are the above-mentioned coincidence detection and display of the encrypted code performed.

Power source circuit 354 can feed power to external electronic key apparatus 320 via cord 303 and power feed terminal 304. When power is fed, power feed-terminal 304 need only be inserted in power-reception terminal 310.

What is claimed is:

1. An electronic key apparatus comprising:
- encrypted code storage means for storing an encrypted code for unlocking an electronic lock;
- pass data storage means for storing pass data;
- data input switch means for inputting the same pass data as that stored in said pass data storage means;
- data coinidence detection means for detecting a coincidence between the data input by said data input switch means and the pass data stored in said pass data storage means;
- manual switch means; and
- encrypted code transmission means for transmitting the encrypted code stored in said encrypted code storage means to said electronic lock when said coincidence is detected by said data coincidence detection means and said manual switch means is operated.

2. An apparatus according to claim 1, wherein said encrypted code transmission means comprises light emitting diode means for transmitting the encrypted code as a light signal.

3. An apparatus according to claim 1, wherein said encrypted code transmission means comprises a nonvolatile memory.

4. An apparatus according to claim 1, wherein said encrypted code storage means comprises an item data storage region for indicating a type of said electronic lock, and an encrypted code storage region for storing the encrypted code for releasing said electronic lock.

5. An apparatus according to claim 1, further comprising error alarming means for indicating that a coincidence is not detected by said data coincidence detection means.

6. An apparatus according to claim 1, further comprising receiving means for receiving a signal transmitted from said electronic lock, and a display device which is driven in accordance with the signal received by said receiving means.

7. An apparatus according to claim 6, wherein the signal received by said receiving means includes a signal indicating that said electronic lock cannot be unlocked.

8. An apparatus according to claim 1, further comprising input terminal means for receiving power from said electronic lock, at least said encrypted code transmission means being driven by the power from said input terminal.

9. An apparatus according to claim 1, further comprising timepiece circuit means for obtaining a time signal based on a reference signal.

10. An electronic key apparatus comprising:
- encrypted code storage means for storing an encrypted code for unlocking an electronic lock;
- display means for displaying the encrypted code stored in said encrypted code storage means;
- pass data storage means for storing pass data;
- data input switch means for inputting the same pass data as that stored in said pass data storage means;
- data coincidence detection means for detecting a coincidence between the data input by said data input switch means and the pass data stored in said pass data storage means; and
- encrypted code transmission means for transmitting the encrypted code stored in said encrypted code storage means to said electronic lock when the coincidence is detected by said data coincidence detection means.

11. An apparatus according to claim 10, wherein said encrypted code transmission means comprises light emitting diode means for transmitting the encrypted code as a light signal.

12. An apparatus according to claim 10, wherein said encrypted code transmission means comprises a nonvolatile memory.

13. An apparatus according to claim 10, wherein said encrypted code storage means comprises an item data storage region for indicating a type of said electronic lock, and an encrypted code storage region for storing the encrypted code for releasing said electronic lock.

14. An apparatus according to claim 10, further comprising error alarming means for indicating that a coincidence is not detected by said data coincidence detection means.

15. An apparatus according to claim 10, further comprising receiving means for receiving a signal transmitted from said electronic lock, and display device which is driven in accordance with the signal received by said receiving means.

16. An apparatus according to claim 15 wherein the signal received by said receiving means includes a signal indicating that said electronic lock cannot be unlocked.

17. An apparatus according to claim 10, further comprising input terminal means for receiving power from said electronic lock, at least said encrypted code transmission means being driven by the power from said input terminal means.

18. An apparatus according to claim 10, further comprising timepiece circuit means for obtaining a time signal based on a reference signal.

19. An electronic key apparatus comprising:
- encrypted code storage means for storing an encrypted code for unlocking an electronic lock;
- pass data storage means for storing pass data;
- data input switch means for inputting the same pass data as that stored in said pass data storage means;
- data coincidence detection means for detecting a coincidence between the data input by said data input switch means and the pass data stored in said pass data storage means;
- encrypted code transmission means for transmitting the encrypted code stored in said encrypted code storage means to said electronic lock when the coincidence is detected by said data coincidence detection means; and
- indicating means for indicating that the encrypted code is being transmitted by said encrypted code transmission means.

20. An apparatus according to claim 19, wherein said encrypted code transmission means comprises light emitting diode means for transmitting the encrypted code as a light signal.

21. An apparatus according to claim 19, wherein said encrypted code transmission means comprises a nonvolatile memory.

22. An apparatus according to claim 19, wherein said encrypted code storage means comprises an item data storage region for indicating a type of said electronic lock, and an encrypted code storage region for storing the encrypted code for releasing said electronic lock.

23. An apparatus according to claim 19, further comprising error alarming means for indicating that a coincidence is not detected by said data coincidence detection means.

24. An apparatus according to claim 19, further comprising receiving means for receiving a signal transmitted from said electronic lock, and a display device which is driven in accordance with the signal received by said receiving means.

25. An apparatus according to claim 24, wherein the signal received by said receiving means includes a signal indicating that said electronic lock cannot be unlocked.

26. An apparatus according to claim 19, further comprising input terminal means for receiving power from said electronic lock, at least said encrypted code transmission means being driven by the power from said input terminal means.

27. An apparatus according to claim 19, further comprising timepiece circuit means for obtaining a time signal based on a reference signal.

28. An electronic key apparatus comprising:
- encrypted code storage means for storing an encrypted code for unlocking an electronic lock;
- pass data storage means for storing pass data;
- data input switch means for inputting the same pass data as that stored in said pass data storage means;
- data coincidence detection means for detecting a coincidence between the data input by said data input switch means and the pass data stored in said pass data storage means;
- encrypted code updating means for enabling updating of the encrypted code stored in said encrypted code storage means only when the coincidence is detected by said data coincidence detection means;
- encrypted code transmission means for transmitting the encrypted code stored in said encrypted code storage means to said electronic lock; and
- manual switch means for causing said encrypted code transmission means to transmit the encrypted code, only when the coincidence is detected by said data conicidence detection means.

29. An apparatus according to claim 28, wherein said encrypted code transmission means comprises light emitting diode means for transmitting the encrypted code as a light signal.

30. An apparatus according to claim 28, wherein said encrypted code transmission means comprises a nonvolatile memory.

31. An apparatus according to claim 28, further comprising indicating means for indicating that the encrypted code is being transmitted by said encrypted code transmission means.

32. An apparatus according to claim 28, further comprising display means for displaying the encrypted code stored in said encrypted code storage means.

33. An apparatus according to claim 28, wherein said encrypted code storage means comprises an item data storage region for indicating a type of said electronic lock, and an encrypted code storage region for storing the encrypted code for releasing said electronic lock.

34. An apparatus according to claim 28, further comprising error alarming means for indicating that a coincidence is not detected by said data coincidence detection means.

35. An apparatus according to claim 28, further comprising receiving means for receiving a signal transmitted from said electronic lock, and a display device which is driven in accordance with the signal received by said receiving means.

36. An apparatus according to claim 28, wherein the signal received by said receiving means includes a signal indicating that said elctornic lock cannot be unlocked.

37. An apparatus according to claim 28, wherein said encrypted code storage means includes means for storing a plurality of encrypted codes, and said apparatus further comprises operation switch means for causing said encrypted code transmission means to sequentially transmit the plurality of encrypted codes stored in said encrypted code storage means.

38. An apparatus according to claim 37, further comprising input terminal means for receiving power from said electronic lock, at least said encrypted code transmission means being driven by the power from said input terminal means.

39. An apparatus according to claim 28, further comprising timepiece circuit means for obtaining a time signal based on a reference signal.

40. An electronic key apparatus comprising:

key data input means including item input means for inputting an item data indicating a type of an electronic lock, and encrypted code input means for inputting an encrypted code for unlocking the electronic lock for each item data;

key data storage means for storing a plurality of item data and encrypted codes corresponding thereto input by said key data input means;

display means for displaying the item data and encrypted codes stored in said key data storage means;

pass data storage means for storing pass data;

pass data input means for inputting the pass data;

judging means for judging whether or not the pass data input by said pass data input means coincides with pass data stored in said pass data storage means; and encrypted code transmission means for transmitting the encrypted code stored in said key data storage means when the coincidence is detected by said judging means said encrypted code transmission means comprising:

item selection means for selecting one of the plurality of item data; and means for reading out the encrypted code corresponding to the item data selected by said item selection means and for sending out the readout encrypted code.

41. An apparatus according to claim 40, wherein said item selection means comprises means for key inputting an item data to be selected.

42. An apparatus according to claim 40, further comprising storage means for storing the coincidence detected by said judging means, selection of said item selection means being enabled by said storage means.

43. An apparatus according to claim 40, wherein said encrypted code transmission means comprises light emitting diode means for transmitting the encrypted code as a light signal.

44. An apparatus according to claim 40, wherein said encrypted code transmission means comprises a nonvolatile memory.

45. An apparatus according to claim 40, further comprising indicating means for indicating that the encrypted code is being transmitted by said encrypted code transmission means.

46. An apparatus according to claim 40, further comprising error alarming means for indicating that a coincidence is not detected by said judging means.

47. An apparatus according to claim 40, further comprising receiving means for receiving a signal transmitted from said electronic lock, and a display device which is driven in accordance with the signal received by said receiving means.

48. An apparatus according to claim 47, wherein the signal received by said receiving means includes a signal indicating that said electronic lock cannot be unlocked.

49. An apparatus according to claim 40, further comprising input terminal means for receiving power from said electronic lock, at least said encrypted code transmission means being driven by the power from said input terminal means.

50. An apparatus according to claim 40, further comprising timepiece circuit means for obtaining a time signal based on a reference signal.

* * * * *